(12) United States Patent
Winer

(10) Patent No.: US 9,977,779 B2
(45) Date of Patent: May 22, 2018

(54) AUTOMATIC SUPPLEMENTATION OF WORD CORRECTION DICTIONARIES

(71) Applicant: Apple Inc., Cupertino, CA (US)

(72) Inventor: Morgan Winer, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 14/203,284

(22) Filed: Mar. 10, 2014

(65) Prior Publication Data

US 2014/0281944 A1    Sep. 18, 2014

Related U.S. Application Data

(60) Provisional application No. 61/785,703, filed on Mar. 14, 2013.

(51) Int. Cl.
G06F 17/28 (2006.01)
G06F 17/27 (2006.01)

(52) U.S. Cl.
CPC ............ G06F 17/28 (2013.01); G06F 17/273 (2013.01); G06F 17/276 (2013.01); G06F 17/2735 (2013.01)

(58) Field of Classification Search
CPC combination set(s) only.
See application file for complete search history.

(56) References Cited

U.S. PATENT DOCUMENTS 3,704,345 A   11/1972  Coker et al.
3,828,132 A    8/1974  Flanagan et al.
3,979,557 A    9/1976  Schulman et al.
(Continued)

FOREIGN PATENT DOCUMENTS

CH       681573 A5    4/1993
DE     3837590 A1    5/1990
(Continued)

OTHER PUBLICATIONS

Cheyer, Adam, "About Adam Cheyer", available online at <http://www.adam.cheyer.com/about.html>, retrieved from Internet on Sep. 17, 2012, 2 pages.
(Continued)

*Primary Examiner* — Stephen Hong
*Assistant Examiner* — Hope C Sheffield
(74) *Attorney, Agent, or Firm* — Dentons US LLP

(57) ABSTRACT

Methods and systems for providing a supplemental word correction dictionary are provided. The method is performed at one or more electronic devices each having one or more processors and memory storing one or more programs for execution by the one or more processors. The method includes receiving an at least partial word input by a user. In some implementations, the at least partial word is input into a text field, such as an email body. The method includes determining that a use condition of the at least partial word is satisfied, such as whether the word appears in a trigger word list. The method further includes, in response to determining that the use condition is satisfied, obtaining a supplemental word correction dictionary that includes words associated with a same subject matter as the at least partial word, wherein the supplemental word correction dictionary supplements an existing word correction dictionary.

47 Claims, 8 Drawing Sheets

Trigger Word List
242

| Trigger Words | Subject Matter |
|---|---|
| dactyledema | Medical |
| ectopic | Medical |
| parte | Legal |
| partes | Legal |
| reexamination | Legal |
| syzgzy | Scientific; Astronomy |
| Pujols | Sports; California Sports; Baseball |
| Favre | Sports; Wisconsin Sports; Football |

(56) References Cited

U.S. PATENT DOCUMENTS

| | | |
|---|---|---|
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,518 A | 5/1989 | Feustel et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,617 A | 9/1991 | Shepard et al. |
| 5,057,915 A | 10/1991 | Von Kohorn |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,627 A | 1/1993 | Sweet et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh et al. |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,216 A | 3/1998 | Logan et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |

(56) References Cited

U.S. PATENT DOCUMENTS

| | | |
|---|---|---|
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,233 A | 1/1999 | Poletti |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,394 A | 9/1999 | Gould et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,281 B1 | 9/2002 | Walters et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,519,565 B1 | 2/2003 | Clements et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |

(56) References Cited

U.S. PATENT DOCUMENTS

| | | | |
|---|---|---|---|
| 6,757,718 B1 | 6/2004 | Halverson et al. | |
| 6,766,320 B1 | 7/2004 | Wang et al. | |
| 6,772,123 B2 | 8/2004 | Cooklev et al. | |
| 6,778,951 B1 | 8/2004 | Contractor | |
| 6,778,952 B2 | 8/2004 | Bellegarda | |
| 6,778,962 B1 | 8/2004 | Kasai et al. | |
| 6,778,970 B2 | 8/2004 | Au | |
| 6,785,869 B1 * | 8/2004 | Berstis | G06F 17/241 707/E17.005 |
| 6,792,082 B1 | 9/2004 | Levine | |
| 6,807,574 B1 | 10/2004 | Partovi et al. | |
| 6,810,379 B1 | 10/2004 | Vermeulen et al. | |
| 6,813,491 B1 | 11/2004 | McKinney | |
| 6,829,603 B1 | 12/2004 | Chai et al. | |
| 6,832,194 B1 | 12/2004 | Mozer et al. | |
| 6,842,767 B1 | 1/2005 | Partovi et al. | |
| 6,847,966 B1 | 1/2005 | Sommer et al. | |
| 6,847,979 B2 | 1/2005 | Allemang et al. | |
| 6,851,115 B1 | 2/2005 | Cheyer et al. | |
| 6,859,931 B1 | 2/2005 | Cheyer et al. | |
| 6,895,380 B2 | 5/2005 | Sepe, Jr. | |
| 6,895,558 B1 | 5/2005 | Loveland | |
| 6,901,399 B1 | 5/2005 | Corston et al. | |
| 6,912,499 B1 | 6/2005 | Sabourin et al. | |
| 6,924,828 B1 | 8/2005 | Hirsch | |
| 6,928,614 B1 | 8/2005 | Everhart | |
| 6,931,384 B1 | 8/2005 | Horvitz et al. | |
| 6,934,684 B2 | 8/2005 | Alpdemir et al. | |
| 6,937,975 B1 | 8/2005 | Elworthy | |
| 6,937,986 B2 | 8/2005 | Denenberg et al. | |
| 6,964,023 B2 | 11/2005 | Maes et al. | |
| 6,980,949 B2 | 12/2005 | Ford | |
| 6,980,955 B2 | 12/2005 | Okutani et al. | |
| 6,985,865 B1 | 1/2006 | Packingham et al. | |
| 6,988,071 B1 | 1/2006 | Gazdzinski | |
| 6,996,531 B2 | 2/2006 | Korall et al. | |
| 6,999,927 B2 | 2/2006 | Mozer et al. | |
| 7,020,685 B1 | 3/2006 | Chen et al. | |
| 7,024,363 B1 | 4/2006 | Comerford et al. | |
| 7,027,974 B1 | 4/2006 | Busch et al. | |
| 7,036,128 B1 | 4/2006 | Julia et al. | |
| 7,050,977 B1 | 5/2006 | Bennett | |
| 7,058,569 B2 | 6/2006 | Coorman et al. | |
| 7,062,428 B2 | 6/2006 | Hogenhout et al. | |
| 7,069,560 B1 | 6/2006 | Cheyer et al. | |
| 7,092,887 B2 | 8/2006 | Mozer et al. | |
| 7,092,928 B1 | 8/2006 | Elad et al. | |
| 7,093,693 B1 | 8/2006 | Gazdzinski | |
| 7,127,046 B1 | 10/2006 | Smith et al. | |
| 7,127,403 B1 | 10/2006 | Saylor et al. | |
| 7,136,710 B1 | 11/2006 | Hoffberg et al. | |
| 7,137,126 B1 | 11/2006 | Coffman et al. | |
| 7,139,714 B2 | 11/2006 | Bennett et al. | |
| 7,139,722 B2 | 11/2006 | Perrella et al. | |
| 7,152,070 B1 | 12/2006 | Musick et al. | |
| 7,177,798 B2 | 2/2007 | Hsu et al. | |
| 7,197,460 B1 | 3/2007 | Gupta et al. | |
| 7,200,559 B2 | 4/2007 | Wang | |
| 7,203,646 B2 | 4/2007 | Bennett | |
| 7,216,073 B2 | 5/2007 | Lavi et al. | |
| 7,216,080 B2 | 5/2007 | Tsiao et al. | |
| 7,225,125 B2 | 5/2007 | Bennett et al. | |
| 7,233,790 B2 | 6/2007 | Kjellberg et al. | |
| 7,233,904 B2 | 6/2007 | Luisi | |
| 7,266,496 B2 | 9/2007 | Wang et al. | |
| 7,277,854 B2 | 10/2007 | Bennett et al. | |
| 7,290,039 B1 | 10/2007 | Lisitsa et al. | |
| 7,296,019 B1 * | 11/2007 | Chandrasekar | G06F 17/273 |
| 7,299,033 B2 | 11/2007 | Kjellberg et al. | |
| 7,310,600 B1 | 12/2007 | Garner et al. | |
| 7,324,947 B2 | 1/2008 | Jordan et al. | |
| 7,349,953 B2 | 3/2008 | Lisitsa et al. | |
| 7,376,556 B2 | 5/2008 | Bennett | |
| 7,376,645 B2 | 5/2008 | Bernard | |
| 7,379,874 B2 | 5/2008 | Schmid et al. | |
| 7,386,449 B2 | 6/2008 | Sun et al. | |
| 7,389,224 B1 | 6/2008 | Elworthy | |
| 7,392,185 B2 | 6/2008 | Bennett | |
| 7,398,209 B2 | 7/2008 | Kennewick et al. | |
| 7,403,938 B2 | 7/2008 | Harrison et al. | |
| 7,409,337 B1 | 8/2008 | Potter et al. | |
| 7,415,100 B2 | 8/2008 | Cooper et al. | |
| 7,418,392 B1 | 8/2008 | Mozer et al. | |
| 7,426,467 B2 | 9/2008 | Nashida et al. | |
| 7,427,024 B1 | 9/2008 | Gazdzinski et al. | |
| 7,447,635 B1 | 11/2008 | Konopka et al. | |
| 7,454,351 B2 | 11/2008 | Jeschke et al. | |
| 7,467,087 B1 | 12/2008 | Gillick et al. | |
| 7,475,010 B2 | 1/2009 | Chao | |
| 7,483,894 B2 | 1/2009 | Cao | |
| 7,487,089 B2 | 2/2009 | Mozer | |
| 7,496,498 B2 | 2/2009 | Chu et al. | |
| 7,496,512 B2 | 2/2009 | Zhao et al. | |
| 7,502,738 B2 | 3/2009 | Kennewick et al. | |
| 7,508,373 B2 | 3/2009 | Lin et al. | |
| 7,522,927 B2 | 4/2009 | Fitch et al. | |
| 7,523,108 B2 | 4/2009 | Cao | |
| 7,526,466 B2 | 4/2009 | Au | |
| 7,529,671 B2 | 5/2009 | Rockenbeck et al. | |
| 7,529,676 B2 | 5/2009 | Koyama | |
| 7,539,656 B2 | 5/2009 | Fratkina et al. | |
| 7,546,382 B2 | 6/2009 | Healey et al. | |
| 7,548,895 B2 | 6/2009 | Pulsipher | |
| 7,552,055 B2 | 6/2009 | Lecoeuche | |
| 7,555,431 B2 | 6/2009 | Bennett | |
| 7,558,730 B2 | 7/2009 | Davis et al. | |
| 7,571,106 B2 | 8/2009 | Cao et al. | |
| 7,599,918 B2 | 10/2009 | Shen et al. | |
| 7,620,549 B2 | 11/2009 | Di Cristo et al. | |
| 7,624,007 B2 | 11/2009 | Bennett | |
| 7,634,409 B2 | 12/2009 | Kennewick et al. | |
| 7,636,657 B2 | 12/2009 | Ju et al. | |
| 7,640,160 B2 | 12/2009 | Di Cristo et al. | |
| 7,647,225 B2 | 1/2010 | Bennett et al. | |
| 7,657,424 B2 | 2/2010 | Bennett | |
| 7,664,638 B2 | 2/2010 | Cooper et al. | |
| 7,672,841 B2 | 3/2010 | Bennett | |
| 7,676,026 B1 | 3/2010 | Baxter, Jr. | |
| 7,684,985 B2 | 3/2010 | Dominach et al. | |
| 7,693,715 B2 | 4/2010 | Hwang et al. | |
| 7,693,720 B2 | 4/2010 | Kennewick et al. | |
| 7,698,131 B2 | 4/2010 | Bennett | |
| 7,702,500 B2 | 4/2010 | Blaedow | |
| 7,702,508 B2 | 4/2010 | Bennett | |
| 7,707,027 B2 | 4/2010 | Balchandran et al. | |
| 7,707,032 B2 | 4/2010 | Wang et al. | |
| 7,707,267 B2 | 4/2010 | Lisitsa et al. | |
| 7,711,565 B1 | 5/2010 | Gazdzinski | |
| 7,711,672 B2 | 5/2010 | Au | |
| 7,716,056 B2 | 5/2010 | Weng et al. | |
| 7,720,674 B2 | 5/2010 | Kaiser et al. | |
| 7,720,683 B1 | 5/2010 | Vermeulen et al. | |
| 7,721,301 B2 | 5/2010 | Wong et al. | |
| 7,725,307 B2 | 5/2010 | Bennett | |
| 7,725,318 B2 | 5/2010 | Gavalda et al. | |
| 7,725,320 B2 | 5/2010 | Bennett | |
| 7,725,321 B2 | 5/2010 | Bennett | |
| 7,729,904 B2 | 6/2010 | Bennett | |
| 7,729,916 B2 | 6/2010 | Coffman et al. | |
| 7,734,461 B2 | 6/2010 | Kwak et al. | |
| 7,747,616 B2 | 6/2010 | Yamada et al. | |
| 7,752,152 B2 | 7/2010 | Paek et al. | |
| 7,756,868 B2 | 7/2010 | Lee | |
| 7,774,204 B2 | 8/2010 | Mozer et al. | |
| 7,783,486 B2 | 8/2010 | Rosser et al. | |
| 7,801,729 B2 | 9/2010 | Mozer | |
| 7,809,570 B2 | 10/2010 | Kennewick et al. | |
| 7,809,610 B2 | 10/2010 | Cao | |
| 7,818,176 B2 | 10/2010 | Freeman et al. | |
| 7,822,608 B2 | 10/2010 | Cross, Jr. et al. | |
| 7,826,945 B2 | 11/2010 | Zhang et al. | |
| 7,831,426 B2 | 11/2010 | Bennett | |
| 7,840,400 B2 | 11/2010 | Lavi et al. | |
| 7,840,447 B2 | 11/2010 | Kleinrock et al. | |

(56) References Cited

U.S. PATENT DOCUMENTS

| | | | |
|---|---|---|---|
| 7,853,574 B2 | 12/2010 | Kraenzel et al. |
| 7,853,664 B1 | 12/2010 | Wang et al. |
| 7,873,519 B2 | 1/2011 | Bennett |
| 7,873,654 B2 | 1/2011 | Bernard |
| 7,881,936 B2 | 2/2011 | Longe et al. |
| 7,890,652 B2 | 2/2011 | Bull et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,032,383 B1 | 10/2011 | Bhardwaj et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longe et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,296,383 B2 | 10/2012 | Lindahl |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,386,926 B1* | 2/2013 | Matsuoka ............... G06F 17/273 715/256 |
| 8,447,612 B2 | 5/2013 | Gazdzinski |
| 2001/0047264 A1 | 11/2001 | Roundtree |
| 2002/0010584 A1 | 1/2002 | Schultz et al. |
| 2002/0032564 A1 | 3/2002 | Ehsani et al. |
| 2002/0035474 A1 | 3/2002 | Alpdemir |
| 2002/0046025 A1 | 4/2002 | Hain |
| 2002/0069063 A1 | 6/2002 | Buchner et al. |
| 2002/0077817 A1 | 6/2002 | Atal |
| 2002/0103641 A1 | 8/2002 | Kuo et al. |
| 2002/0116185 A1 | 8/2002 | Cooper et al. |
| 2002/0116189 A1 | 8/2002 | Yeh et al. |
| 2002/0164000 A1 | 11/2002 | Cohen et al. |
| 2002/0198714 A1 | 12/2002 | Zhou |
| 2003/0061570 A1 | 3/2003 | Hatori et al. |
| 2003/0088414 A1 | 5/2003 | Huang et al. |
| 2003/0097210 A1 | 5/2003 | Horst et al. |
| 2003/0135740 A1 | 7/2003 | Talmor et al. |
| 2004/0135701 A1 | 7/2004 | Yasuda et al. |
| 2004/0155869 A1* | 8/2004 | Robinson ............... G06F 3/0219 345/168 |
| 2004/0199387 A1 | 10/2004 | Wang et al. |
| 2004/0220798 A1 | 11/2004 | Chi et al. |
| 2004/0236778 A1 | 11/2004 | Junqua et al. |
| 2005/0002507 A1 | 1/2005 | Timmins et al. |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | Di Fabbrizio et al. |
| 2005/0182629 A1 | 8/2005 | Coorman et al. |
| 2005/0196733 A1 | 9/2005 | Budra et al. |
| 2005/0273626 A1 | 12/2005 | Pearson et al. |
| 2005/0288936 A1 | 12/2005 | Busayapongchai et al. |
| 2006/0018492 A1 | 1/2006 | Chiu et al. |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2006/0217967 A1 | 9/2006 | Goertzen et al. |
| 2006/0230350 A1* | 10/2006 | Baluja ................... G06F 3/0237 715/700 |
| 2006/0235700 A1 | 10/2006 | Wong et al. |
| 2007/0041361 A1 | 2/2007 | Iso-Sipila |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174188 A1 | 7/2007 | Fish |
| 2007/0185917 A1 | 8/2007 | Prahlad et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0082332 A1 | 4/2008 | Mallett et al. |
| 2008/0082338 A1 | 4/2008 | O'Neil et al. |
| 2008/0120112 A1 | 5/2008 | Jordan et al. |
| 2008/0129520 A1 | 6/2008 | Lee |
| 2008/0140416 A1 | 6/2008 | Shostak |
| 2008/0140657 A1 | 6/2008 | Azvine et al. |
| 2008/0195388 A1* | 8/2008 | Bower ................... G06F 3/0237 704/243 |
| 2008/0221903 A1 | 9/2008 | Kanevsky et al. |
| 2008/0228496 A1 | 9/2008 | Yu et al. |
| 2008/0243834 A1* | 10/2008 | Rieman ................. G06F 17/276 |
| 2008/0247519 A1 | 10/2008 | Abella et al. |
| 2008/0249770 A1 | 10/2008 | Kim et al. |
| 2008/0256613 A1 | 10/2008 | Grover |
| 2008/0263139 A1* | 10/2008 | Martin ............. G06F 17/30905 709/203 |
| 2008/0300878 A1 | 12/2008 | Bennett |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0018835 A1 | 1/2009 | Cooper et al. |
| 2009/0030800 A1 | 1/2009 | Grois |
| 2009/0055179 A1 | 2/2009 | Cho et al. |
| 2009/0058823 A1 | 3/2009 | Kocienda |

(56) References Cited

U.S. PATENT DOCUMENTS

| | | |
|---|---|---|
| 2009/0076796 A1 | 3/2009 | Daraselia |
| 2009/0077165 A1 | 3/2009 | Rhodes et al. |
| 2009/0100049 A1 | 4/2009 | Cao |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0204409 A1 | 8/2009 | Mozer et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0306969 A1 | 12/2009 | Goud et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0088100 A1 | 4/2010 | Lindahl |
| 2010/0114887 A1* | 5/2010 | Conway ............... G06F 3/0237 707/737 |
| 2010/0131273 A1 | 5/2010 | Aley-Raz et al. |
| 2010/0138215 A1 | 6/2010 | Williams |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0278320 A1 | 11/2010 | Arsenault et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | Van Os et al. |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | DiCristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0298585 A1 | 12/2011 | Barry |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0173222 A1* | 7/2012 | Wang ............... G06F 17/273 704/2 |
| 2012/0173464 A1 | 7/2012 | Tur et al. |
| 2012/0265528 A1 | 10/2012 | Gruber et al. |
| 2012/0271676 A1 | 10/2012 | Aravamudan et al. |
| 2012/0311583 A1 | 12/2012 | Gruber et al. |
| 2012/0330661 A1 | 12/2012 | Lindahl |
| 2013/0006638 A1 | 1/2013 | Lindahl |
| 2013/0110518 A1 | 5/2013 | Gruber et al. |
| 2013/0110520 A1 | 5/2013 | Cheyer et al. |
| 2014/0067371 A1* | 3/2014 | Liensberger ........ G06F 17/273 704/9 |

FOREIGN PATENT DOCUMENTS

| | | |
|---|---|---|
| DE | 19841541 B4 | 12/2007 |
| EP | 0138061 A1 | 4/1985 |
| EP | 0218859 A2 | 4/1987 |
| EP | 0262938 A1 | 4/1988 |
| EP | 0138061 B1 | 6/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0570660 A1 | 11/1993 |
| EP | 0863453 A1 | 9/1998 |
| EP | 0559349 B1 | 1/1999 |
| EP | 1229496 A2 | 8/2002 |
| EP | 1245023 A1 | 10/2002 |
| EP | 2109295 A1 | 10/2009 |
| GB | 2293667 A | 4/1996 |
| JP | 6-19965 A | 1/1994 |
| JP | 2001-125896 A | 5/2001 |
| JP | 2002-24212 A | 1/2002 |
| JP | 2003-517158 A | 5/2003 |
| JP | 2009-36999 A | 2/2009 |
| KR | 10-0757496 B1 | 9/2007 |
| KR | 10-0776800 B1 | 11/2007 |
| KR | 10-0801227 B1 | 2/2008 |
| KR | 10-0810500 B1 | 3/2008 |
| KR | 10-2008-0109322 A | 12/2008 |
| KR | 10-2009-0086805 A | 8/2009 |
| KR | 10-0920267 B1 | 10/2009 |
| KR | 10-2010-0119519 A | 11/2010 |
| KR | 10-1032792 B1 | 5/2011 |
| KR | 10-2011-0113414 A | 10/2011 |
| WO | 1995/002221 A1 | 1/1995 |
| WO | 1997/026612 A1 | 7/1997 |
| WO | 1998/041956 A1 | 9/1998 |
| WO | 1999/001834 A1 | 1/1999 |
| WO | 1999/008238 A1 | 2/1999 |
| WO | 1999/056227 A1 | 11/1999 |
| WO | 2000/060435 A2 | 10/2000 |
| WO | 2000/060435 A3 | 4/2001 |
| WO | 2002/073603 A1 | 9/2002 |
| WO | 2006/129967 A1 | 12/2006 |
| WO | 2008/085742 A2 | 7/2008 |
| WO | 2008/109835 A2 | 9/2008 |
| WO | 2008/120036 A1 | 10/2008 |
| WO | 2010/075623 A1 | 7/2010 |
| WO | 2011/088053 A2 | 7/2011 |
| WO | 2014/031505 A1 | 2/2014 |

OTHER PUBLICATIONS

Codd, E. F., "Databases: Improving Usability and Responsiveness—How About Recently", 1978, pp. 3-28.

(56) References Cited

OTHER PUBLICATIONS

Cohen et al., "An Open Agent Architecture", SRI International, 1994, pp. 1-8.
Coles et al., "Chemistry Question-Answering", Technical Note 9, Jun. 1969, 15 pages.
Coles et al., "Techniques for Information Retrieval Using an Inferential Question-Answering System with Natural Language Input", Technical Note74, Nov. 1972, 198 pages.
Coles Stephen L., "The Application of Theorem Proving to Information Retrieval", Technical Note 51, Jan. 21, 1971, 21 pages.
Conklin, "Hypertext: An Introduction and Survey", Computer Magazine, Sep. 1987, 25 pages.
Connolly et al., "Fast Algorithms for Complex Matrix Multiplication Using Surrogates", IEEE Transactions on Acoustics, Speech, and Signal Processing, vol. 37, No. 6, Jun. 1989, 13 pages.
Constantinides et al., "A Schema Based Approach to Dialog Control", Proceedings of the International Conference on Spoken Language Processing, 1998, 4 pages.
Cox et al., "Speech and Language Processing for Next-Millennium Communications Services", Proceedings of the IEEE, vol. 88, No. 8, Aug. 2000, pp. 1314-1337.
Craig et al., "Deacon: Direct English Access and Control", AFIPS Conference Proceedings, vol. 29, Nov. 7-10, 1966, pp. 365-380.
Cutkosky et al., "PACT: An Experiment in Integrating Concurrent Engineering Systems", Jan. 1993, pp. 1-13.
Dar et al., "DTL's DataSpot: Database Exploration Using Plain Language", Proceedings of the 24th VLDB Conference, 1998, pp. 645-649.
Davis et al., "A Personal Handheld Multi-Modal Shopping Assistant", IEEE, 2006, 9 pages.
Decker et al., "Designing Behaviors for Information Agents", Jul. 6, 1996, pp. 1-15.
Decker et al., "Matchmaking and Brokering", May 16, 1996, pp. 1-19.
Deerwester et al., "Indexing by Latent Semantic Analysis", Journal of the American Society for Information Science, vol. 41, No. 6, Sep. 1990, 19 pages.
Deller, Jr., et al., "Discrete-Time Processing of Speech Signals", May 13, 1993, pp. 114-137.
Digital Equipment Corporation, "Open VMS Software Overview", Dec. 1995, 159 pages.
Domingue et al., "Web Service Modeling Ontology (WSMO)—An Ontology for Semantic Web Services", Position paper at the W3C Workshop on Frameworks for Semantics in Web Services, Jun. 9-10, 2005, 6 pages.
Donovan, Robert E., "A New Distance Measure for Costing Spectral Discontinuities in Concatenative Speech Synthesisers", 2001, 4 pages.
Dowding et al., "Gemini: A Natural Language System for Spoken-Language Understanding", Proceedings of the Thirty-First Annual Meeting of the Association for Computational Linguistics, 1993, 8 pages.
Dowding et al., "Interleaving Syntax and Semantics in an Efficient Bottom-Up Parser", Proceedings of the 32nd Annual Meeting of the Association for Computational Linguistics, 1994, 7 pages.
Elio et al., "On Abstract Task Models and Conversation Policies", 1999, pp. 1-10.
Epstein et al., "Natural Language Access to a Melanoma Data Base", Technical Note 171, Sep. 1978, 7 pages.
Ericsson et al., "Software Illustrating a Unified Approach to Multimodality and Multilinguality in the in-home Domain", Talk and Look: Tools for Ambient Linguistic Knowledge, Dec. 22, 2006, 127 pages.
Evi, "Meet Evi: The One Mobile App that Provides Solutions for Your Everyday Problems", avialable online at <http://www.evi.com/>, retrieved on Feb. 8, 2012, 3 pages.
Grosz et al., "Dialogic: A Core Natural-Language Processing System", SRI International, Nov. 9, 1982, 17 pages.
Exhibit, 1, "Natural Language Interface Using Constrained Intermediate Dictionary of Results", List of Publications Manually reviewed for the Search of U.S. Pat. No. 7,177,798, Mar. 22, 2013, 1 page.
Feigenbaum et al., "Computer-assisted Semantic Annotation of Scientific Life Works", Oct. 15, 2007, 22 pages.
Ferguson et al., "TRIPS: An Integrated Intelligent Problem-Solving Assistant", Proceedings of the Fifteenth National Conference on Artificial Intelligence (AAAI-98) and Tenth Conference on Innovative Applications of Artificial Intelligence (IAAI-98), 1998, 7 pages.
Fikes et al., "A Network-based knowledge Representation and its Natural Deduction System", SRI International, Jul. 1977, 43 pages.
Frisse, M. E., "Searching for Information in a Hypertext Medical Handbook", Communications of the ACM, vol. 31, No. 7, Jul. 1988, 8 pages.
Gamback et al., "The Swedish Core Language Engine", NOTEX Conference, 1992, 17 pages.
Gannes, Liz, "Alfred App Gives Personalized Restaurant Recommendations", AllThingsD, Jul. 18, 2011, pp. 1-3.
Gautier et al., "Generating Explanations of Device Behavior Using Compositional Modeling and Causal Ordering", CiteSeerx, 1993, pp. 89-97.
Gervasio et al., "Active Preference Learning for Personalized Calendar Scheduling Assistancae", CiteSeerx, In Proc. of IUI'05, Jan. 9-12, 2005, pp. 90-97.
Glass et al., "Multilingual Language Generation Across Multiple Domains", International Conference on Spoken Language Processing, Japan, Sep. 18-22, 1994, 5 pages.
Glass et al., "Multilingual Spoken-Language Understanding in the Mit Voyager System", <http://groups.csail.mit.edu/sls/publications/1995/speechcomm95-voyager.pdf>, Aug. 1995, 29 pages.
Glass, Alyssa, "Explaining Preference Learning", CiteSeerx, 2006, pp. 1-5.
Goddeau et al., "A Form-Based Dialogue Manager for Spoken Language Applications", http://phasedance.com/pdf!icslp96.pdf, Oct. 1996, 4 pages.
Goddeau et al., "Galaxy: A Human-Language Interface to On-Line Travel Information", International Conference on Spoken Language Processing 1994, YOKOHAMA, 1994, pp. 707-710.
Goldberg et al., "Using Collaborative Filtering to Weave an Information Tapestry", Communications of the ACM, vol. 35, No. 12, Dec. 1992, 10 pages.
Gorin et al., "On Adaptive Acquisition of Language", International Conference on Acoustics, Speech, and Signal Processing (ICASSP'90), vol. 1, Apr. 3-6, 1990, 5 pages.
Gotoh et al., "Document Space Models Using Latent Semantic Analysis", In Proceedings of Eurospeech, 1997, 4 pages.
Gray, R. M., "Vector Quantization", IEEE ASSP Magazine, Apr. 1984, 26 pages.
Green, C., "The Application of Theorem Proving to Question-Answering Systems", SRI Stanford Research Institute, Artificial Intelligence Group, Jun. 1969, 169 pages.
Gregg et al., "DSS Access on the WWW: An Intelligent Agent Prototype", Proceedings of the Americas Conference on Information Systems—Association for Information Systems, 1998, 3 pages.
Grishman et al., "Computational Linguistics: An Introduction", © Cambridge University Press, 1986, 172 pages.
Grosz et al., "Research on Natural-Language Processing at SRI", SRI International Technical Note 257, Nov. 1981, 21 pages.
Grosz et al., "TEAM: An Experiment in the Design of Transportable Natural-Language Interfaces", Artificial Intelligence, vol. 32, 1987, pp. 173-243.
Grosz, Barbara J., "Team: A Transportable Natural-Language Interface System", Proceedings of the First Conference on Applied Natural Language Processing, 1983, pp. 39-45.
Gruber et al., "An Ontology for Engineering Mathematics", Fourth International Conference on Principles of Knowledge Representation and Reasoning, Available at <http://www-ksl.stanford.edu/knowledge-sharing/papers/engmath.html>, 1994, pp. 1-22.
Gruber et al., "Generative Design Rationale: Beyond the Record and Replay Paradigm", Knowledge Systems Laboratory, Technical Report KSL 92-59, Dec. 1991, Updated Feb. 1993, 24 pages.

(56) References Cited

OTHER PUBLICATIONS

Gruber et al., "Machine-Generated Explanations of Engineering Models: A Compositional Modeling Approach", In Proc. International Joint Conference on Artificial Intelligence, 1993, 7 pages.

Gruber et al., "NIKE: A National Infrastructure for Knowledge Exchange", A Whitepaper Advocating and ATP Initiative on Technologies for Lifelong Learning, Oct. 1994, pp. 1-10.

Gruber et al., "Toward a Knowledge Medium for Collaborative Product Development", Proceedings of the Second International Conference on Artificial Intelligence in Design, Jun. 22-25, 1992, pp. 1-19.

Gruber et al., "A Translation Approach to Portable Ontology Specifications", Knowledge Systems Laboratory, Technical Report KSL 92-71, Sep. 1992, Revised Apr. 1993, 27 pages.

Gruber, Thomas R., "Automated Knowledge Acquisition for Strategic Knowledge", Machine Learning, vol. 4, 1989, pp. 293-336.

Gruber, Thomas R., Interactive Acquisition of Justifications: Learning "Why" by Being Told "What", Knowledge Systems Laboratory, Technical Report KSL 91-17, Original Oct. 1990, Revised Feb. 1991, pp. 1-23.

Gruber, Thomas R., "Toward Principles for the Design of Ontologies Used for Knowledge Sharing", In International Journal Human-Computer Studies, vol. 43, p. 907-928, substantial revision of paper presented at the International Workshop on Formal Ontology, Available as Technical Report KSL 93-04, Knowledge Systems Laboratory, revised Aug. 23, 1993, 23 pages.

Gruber, Tom, "(Avoiding) the Travesty of the Commons", Presentation at NPUC, New Paradigms for User Computing, IBM Almaden Research Center, Jul. 24, 2006, 52 pages.

Gruber, Tom, "2021: Mass Collaboration and the Really New Economy", TNTY Futures, vol. 1, No. 6, Available Online at <http://tomgruber.org/writing/tnty2001.htm>, Aug. 2001, 5 pages.

Gruber, Tom, "Big Think Small Screen: How Semantic Computing in the Cloud will Revolutionize the Consumer Experience on the Phone", Keynote presentation at Web 3.0 conference, 2009, 41 pages.

Gruber, Tom, "Collaborating around Shared Content on the WWW", W3C Workshop on WWW and Collaboration, Available at <http://www.w3.org/Collaboration/Workshop/Proceedings/P9.html>, Sep. 11, 1995, 1 page.

Gruber, Tom, "Collective Knowledge Systems: Where the Social Web meets the Semantic Web", Web Semantics: Science, Services and Agents on the World Wide Web, 2007, pp. 1-19.

Gruber, Tom, "Despite our Best Efforts, Ontologies are not the Problem", AAAI Spring Symposium, Available at <http://tomgruber.org/writing/aaai-ss08.htm>, 2008, pp. 1-40.

Gruber, Tom, "Enterprise Collaboration Management with Intraspect", Intraspect Technical White Paper, Jul. 2001, pp. 1-24.

Gruber, Tom, "Every Ontology is a Treaty—A Social Agreement—Among People with Some Common Motive in Sharing", Official Quarterly Bulletin of AIS Special Interest Group on Semantic Web and Information Systems, vol. 1, No. 3, 2004, pp. 1-5.

Gruber, Tom, "Helping Organizations Collaborate, Communicate, and Learn", Presentation to NASA Ames Research, intraspect, available at <http://tomgruber.org/writing/organizational-intelligence-talk.htm>, Mar.-Oct. 2003, 30 pages.

Gruber, Tom, "Intelligence at the Interface: Semantic Technology and the Consumer Internet Experience", Presentation at Semantic Technologies Conference, Available at <http://tomgruber.org/writing/semtech08.htm>, 2008, pp. 1-40.

Gruber, Tom, "It Is What It Does: The Pragmatics of Ontology for Knowledge Sharing", Proceedings of the International CIDOC CRM Symposium, Available at <http://tomgruber.org/writing/cidoc-ontology.htm>, Mar. 26, 2003, 21 pages.

Gruber, Tom, "Ontologies, Web 2.0 and Beyond", Ontology Summit, available at <http://tomgruber.org/writing/ontolog-social-web-keynote.htm>, Apr. 24, 2007, 17 pages.

Gruber, Tom, "Ontology of Folksonomy: A Mash-up of Apples and Oranges", Int'l Journal on Semantic Web & Information Systems, vol. 3, No. 2, 2007, 7 pages.

Gruber, Tom, "Siri, a Virtual Personal Assistant—Bringing Intelligence to the Interface", Semantic Technologies conference, Jun. 16, 2009, 21 pages.

Gruber, Tom, "TagOntology", Presentation to Tag Camp, Oct. 29, 2005, 20 pages.

Gruber, Tom, "Where the Social Web meets the Semantic Web", Presentation at the 5th International Semantic Web Conference, Nov. 7, 2006, 38 pages.

Guida et al., "NLI: A Robust Interface for Natural Language Person-Machine Communication", Int. J. Man-Machine Studies, vol. 17, 1982, pp. 417-433.

Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.

Guzzoni et al., "Active, a Platform for Building Intelligent Operating Rooms", Surgetica 2007 Computer-Aided Medical Interventions: tools and Applications, Paris, 2007, Sauramps Medical, http://lsro.epfl.ch/page-68384-en.html,, 2007, 8 pages.

Guzzoni et al., "Active, a Platform for Building Intelligent Software,", Computational Intelligence, available online at <http://www.informatik.uni-trier.del-ley/pers/hd/g/Guzzoni:Didier >, 2006, 5 pages.

Guzzoni et al., "Active, a Tool for Building Intelligent User Interfaces", ASC 2007, Palma de Mallorca, <http://lsro.epfl.ch/page-34241.html>, 2007, 6 pages.

Guzzoni et al., "Many Robots Make Short Work", AAAI Robot Contest, SRI International, 1996, pp. 1-9.

Guzzoni et al., "Modeling Human-Agent Interaction with Active Ontologies", AAAI Spring Symposium, Interaction Challenges for Intelligent Assistants, Stanford University, Palo Alto, California, 2007, 8 pages.

Guzzoni, D., "Active: A unified platform for building intelligent assistant applications", Oct. 25, 2007, 262 pages.

Haas et al., "An Approach to Acquiring and Applying Knowledge", SRI international Technical Note 227, Nov. 1980, 22 pages.

Hadidi et al., "Students' Acceptance of Web-Based Course Offerings: An Empirical Assessment", Proceedings of the Americas Conference on Information Systems (AMCIS), 1998, 4 pages.

Hardwar, Devemder, "Driving App Waze Builds its own Siri for Hands-Free Voice Control", retrieved from internet on Feb. 9, 2012 <http ://ventu rebeat. com/20 12/0 2/09/ driving-a pp-waze-bu i lds-its-own-siri-for -hands-freevoice-control/>, 4 pages.

Harris, F. J., "On the Use of Windows for Harmonic Analysis with the Discrete Fourier Transform", In Proceedings of the IEEE, vol. 66, No. 1, Jan. 1978, 34 pages.

Hawkins et al., "Hierarchical Temporal Memory: Concepts, Theory, and Terminology", Numenta, Inc., Mar. 27, 2007, pp. 1-20.

He et al., "Personal Security Agent: KQML-Based PKI", The Robotics Institute, Carnegie-Mellon University, paper, 1997, pp. 1-14.

Helm et al., "Building Visual Language Parsers", In Proceedings of CHI'91 Proceedings of the SIGCHI Conference on Human Factors in Computing Systems, 1991, pp. 105-112.

Hendrix et al., "Developing a Natural Language Interface to Complex Data", ACM Transactions on Database Systems, vol. 3, No. 2, Jun. 1978, pp. 105-147.

Hendrix et al., "Transportable Natural-Language Interfaces to Databases", SRI International, Technical Note 228, Apr. 30, 1981, 18 pages.

Hendrix et al., "Human Engineering for Applied Natural Language Processing", SRI International, Technical Note 139, Feb. 1977, 27 pages.

Hendrix, Gary G., "Klaus: A System for Managing Information and Computational Resources", SRI International, Technical Note 230, Oct. 1980, 34 pages.

Hendrix, Gary G., "Lifer: A Natural Language Interface Facility", SRI Stanford Research Institute, Technical Note 135, Dec. 1976, 9 pages.

Hendrix, Gary G., "Natural-Language Interface", American Journal of Computational Linguistics, vol. 8, No. 2, Apr.-Jun. 1982, pp. 56-61.

(56) References Cited

OTHER PUBLICATIONS

Hendrix, Gary G., "The Lifer Manual: A Guide to Building Practical Natural Language Interfaces", SRI International, Technical Note 138, Feb. 1977, 76 pages.
Hermansky, H., "Perceptual Linear Predictive (PLP) Analysis of Speech", Journal of the Acoustical Society of America, vol. 87, No. 4, Apr. 1990, pp. 1738-1752.
Hermansky, H., "Recognition of Speech in Additive and Convolutional Noise Based on Rasta Spectral Processing", In proceedings of IEEE International Conference on Acoustics, speech and Signal Processing (ICASSP'93), Apr. 27-30, 1993, pp. 11-83-11-86.
Hirschman et al., "Multi-Site Data Collection and Evaluation in Spoken Language Understanding", Proceedings of the workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for Use with an Agent-Oriented Natural Language Interface", Proceedings of HCI International, vol. 4, Jun. 22-27, 2003, pp. 1422-1426.
Hoehfeld et al., "Learning with Limited Numerical Precision Using the Cascade-Correlation Algorithm", IEEE Transactions on Neural Networks, vol. 3, No. 4, Jul. 1992, 18 pages.
Holmes, J. N., "Speech Synthesis and Recognition—Stochastic Models for Word Recognition", Published by Chapman & Hall, London, ISBN 0 412 534304, 1998, 7 pages.
Hon et al., "CMU Robust Vocabulary-Independent Speech Recognition System", IEEE International Conference on Acoustics, Speech, and Signal Processing (ICASSP-91), Apr. 14-17, 1991, pp. 889-892.
Huang et al., "The SPHINX-II Speech Recognition System: An Overview", Computer, Speech and Language, Jan. 15, 1992, pp. 1-12.
Issar et al., "CMU's Robust Spoken Language Understanding System", Proceedings of Eurospeech, 1993, 4 pages.
Issar, Sunil, "Estimation of Language Models for New Spoken Language Applications", Proceedings of 4th International Conference on Spoken language Processing, Oct. 3-6, 1996, 4 pages.
Jacobs et al., "Scisor: Extracting Information from On-Line News", Communications of the ACM, vol. 33, No. 11, Nov. 1990, pp. 88-97.
Janas, Jurgen M., "The Semantics-Based Natural Language Interface to Relational Databases", Chapter 6, Cooperative Interfaces to Information Systems, 1986, pp. 143-188.
Jelinek, F., "Self-Organized Language Modeling for Speech Recognition,", Readings in Speech Recognition, edited by Alex Waibel and Kai-Fu Lee, Morgan Kaufmann Publishers, Inc., ISBN: 1-55860-124-4, May 15, 1990, 63 pages.
Jennings et al., "A Personal News Service Based on a User Model Neural Network", IEICE Transactions on Information and Systems, vol. E75-D, No. 2, Tokyo, JP, Mar. 1992, pp. 198-209.
Ji et al., "A Method for Chinese Syllables Recognition based upon Sub-syllable Hidden Markov Model", 1994 International Symposium on Speech, Image Processing and Neural Networks, Hong Kong, Apr. 13-16, 1994, pp. 730-733.
Johnson, Julia A., "A Data Management Strategy for Transportable Natural Language Interfaces", Doctoral thesis submitted to the Department of Computer Science, University of British Columbia, Canada, Jun. 1989, 285 pages.
Jones, J., "Speech Recognition for Cyclone", Apple Computer, Inc., E.R.S.Revision 2.9, Sep. 10, 1992, 93 pages.
Julia et al., "http://www.speech.sri.com/demos/atis.html", Proceedings of AAAI, Spring Symposium, 1997, 5 pages.
Julia et al., "Un editeur interactif de tableaux dessines a main levee (An Interactive Editor for Hand-Sketched Tables)", Traitement du Signal, vol. 12, No. 6, 1995, pp. 619-626.
Kahn et al., "CoABS Grid Scalability Experiments", Autonomous Agents and Multi-Agent Systems, vol. 7, 2003, pp. 171-178.
Kamel et al., "A Graph Based Knowledge Retrieval System", IEEE International Conference on Systems, Man and Cybernetics, 1990, pp. 269-275.
Karp, P. D., "A Generic Knowledge-Base Access Protocol", <http://lecture.cs.buu.ac.th/-f50353/Document/gfp.pdf>, May 12, 1994, 66 pages.
Kats et al., "Exploiting Lexical Regularities in Designing Natural Language Systems", In the Proceedings of the 12th International Conference on Computational Linguistics, 1988, pp. 1-22.
Katz et al., "REXTOR: A System for Generating Relations from Natural Language", In Proceedings of the ACL Workshop on Natural Language Processing and Information Retrieval (NLP&IR), Oct. 2000, 11 pages.
Katz, Boris, "A Three-Step Procedure for Language Generation", Massachusetts Institute of Technology, A.I. Memo No. 599, Dec. 1980, pp. 1-40.
Katz, Boris, "Annotating the World Wide Web Using Natural Language", In Proceedings of the 5th RIAO Conference on Computer Assisted Information Searching on the Internet, 1997, 7 pages.
Katz, Boris, "Using English for Indexing and Retrieving", Proceedings of the 1st RIAO Conference on User-Oriented Content-Based Text and Image Handling, 1988, pp. 314-332.
Katz, Slava. M., "Estimation of Probabilities from Sparse Data for the Language Model Component of a Speech Recognizer", IEEE Transactions on Acoustics, Speech, and Signal Processing, vol. ASSP-35, No. 3, Mar. 1987, 3 pages.
Kickstarter, "Ivee Sleek: Wi-Fi Voice-Activated Assistant", available online at <https://www.kickstarter.com/projects/ivee/ivee-sleek-wi-fi-voice-activated-assistant> retrived from Internet on Feb. 10 2014, 13 pages.
Kitano, H., "ΦDM-Dialog: An Experimental Speech-to-Speech Dialog Translation System", Computer, vol. 24, No. 6, Jun. 1991, 13 pages.
Klabbers et al., "Reducing Audible Spectral Discontinuities", IEEE Transactions on Speech and Audio Processing, vol. 9, No. 1, Jan. 2001, pp. 39-51.
Klatt Dennis H., "Linguistic Uses of Segmental Duration in English: Acoustic and Perpetual Evidence", Journal of the Acoustical Society of America, vol. 59, No. 5, May 1976, pp. 1208-1221.
Knownav, "Knowledge Navigator", YouTube Video available at <http://www.youtube.com/watch?v=QRH8eimU_20>, Apr. 29, 2008, 1 page.
Kominek et al., "Impact of Durational Outlier Removal from Unit Selection Catalogs", 5th ISCA Speech Synthesis Workshop, Jun. 14-16, 2004, 6 pages.
Konolige, Kurt, "A Framework for a Portable Natural-Language Interface to Large Data Bases", SRI International, Technical Note 197, Oct. 12, 1979, 54 pages.
Kubala et al., "Speaker Adaptation from a Speaker-Independent Training Corpus", International Conference on Acoustics, Speech, and Signal Processing (ICASSP'90), Apr. 3-6, 1990, 4 pages.
Kubala et al., "The Hub and Spoke Paradigm for CSR Evaluation", Proceedings of the Spoken Language Technology Workshop, Mar. 6-8, 1994, 9 pages.
Laird et al., "SOAR: An Architecture for General Intelligence", Artificial Intelligence, vol. 33, 1987, pp. 1-64.
Langly et al., "A Design for the ICARUS Architechture", SIGART Bulletin, vol. 2, No. 4, 1991, pp. 104-109.
Larks, "Intelligent Software Agents", Available Online at <http://www.cs.cmu.edu/~softagents/larks.html> retrieved on Mar. 15, 2013, 2006, 2 pages.
Lee et al., "A Real-Time Mandarin Dictation Machine for Chinese Language with Unlimited Texts and Very Large Vocabulary", International Conference on Acoustics, Speech and Signal Processing, vol. 1, Apr. 3-6, 1990, 5 pages.
Lee et al., "Golden Mandarin(II)—An Improved Single-Chip Real-Time Mandarin Dictation Machine for Chinese Language with Very Large Vocabulary", 0-7803-0946-4/93 © 1993 IEEE, 1993, 4 pages.
Lee et al., "Golden Mandarin(II)—An Intelligent Mandarin Dictation Machine for Chinese Character Input with Adaptation/Learning

(56) References Cited

OTHER PUBLICATIONS

Functions", International Symposium on Speech, Image Processing and Neural Networks, Hong Kong, Apr. 13-16, 1994, 5 pages.
Lee et al., "System Description of Golden Mandarin (I) Voice Input for Unlimited Chinese Characters", International Conference on Computer Processing of Chinese & Oriental Languages, vol. 5, Nos. 3 & 4, Nov. 1991, 16 pages.
Lee, K. F., "Large-Vocabulary Speaker-Independent Continuous Speech Recognition: The SPHINX System", Partial Fulfillment of the requirements for the degree of Doctor of Philosophy, Computer Science Department, Carnegie Mellon University, Apr. 18, 1988, 195 pages.
Lemon et al., "Multithreaded Context for Robust Conversational Interfaces: Context- Sensitive Speech Recognition and Interpretation of Corrective Fragments", ACM Transactions on Computer-Human Interaction, vol. 11, No. 3, Sep. 2004, pp. 241-267.
Leong et al., "CASIS: A Context-Aware Speech Interface System", Proceedings of the 10th International Conference on Intelligent user Interfaces, San Diego, California, Jan. 9-12, 2005, pp. 231-238.
Lieberman et al., "Out of Context: Computer Systems that Adapt to, and Learn from, Context", IBM Systems Journal, vol. 39, No. 3&4, 2000, pp. 617-632.
Lin et al., "A Distributed Architecture for Cooperative Spoken Dialogue Agents with Coherent Dialogue State and History", <http://citeseerx.ist.psu.edu/viewdoc/summary?doi=1 0.1.1.42. 272>, 1999, 4 pages.
Lin et al., "A New Framework for Recognition of Mandarin Syllables With Tones Using Sub-syllabic Units", IEEE International Conference on Acoustics, Speech, and Signal Processing (ICASSP-93), Apr. 27-30, 1993, pp. 227-230.
Linde, "An Algorithm for Vector Quantizer Design", IEEE Transactions on Communications, vol. 28, No. 1, Jan. 1980, pp. 84-95.
Liu et al., "Efficient Joint Compensation of Speech for the Effects of Additive Noise and Linear Filtering", IEEE International Conference of Acoustics, Speech, and Signal Processing,ICASSP-92, Mar. 23-26, 1992, pp. 257-260.
Intraspect Software, "The Intraspect Knowledge Management Solution: Technical Overview", <http://tomgruber.org/writing/intraspect-whitepaper-1998.pdf>, 1998, 18 pages.
Logan et al., "Mel Frequency Cepstral Coefficients for Music Modeling", In International Symposium on Music Information Retrieval, 2000, 2 pages.
Iowegian International, "FIR Filter Properties", dspGuro, Digital Signal Processing Central, available online at <httJ;>://www.dspQuru.com/dso/taas/fir/orooerties, > retrived from internet on Jul. 28, 2010, 6 pages.
Lowerre, B. T., "The-HARPY Speech Recognition System", Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations", Revised Version of a Paper Presented at the Computational Phonology in Speech Technology workshop, 1996 annual meeting of the Association for Computational Linguistics in Santa Cruz, California, 7 pages.
Markel et al., "Linear Prediction of Speech", Springer-Verlag, Berlin Heidelberg New York, 1976, 12 pages.
Martin et al., "The Open Agent Architecture: A Framework for Building Distributed Software Systems", Applied Artificial Intelligence: An International Journal, vol. 13, No. 1-2, pp. 1-38.
Martin et al., "Building and Using Practical Agent Applications", SRI International, PAAM Tutorial, 1998, pp. 1-26.
Martin et al., "Building Distributed Software Systems with the Open Agent Architecture", Proceedings of the Third International Conference on the Practical Application of Intelligent Agents and Multi-Agent Technology, Mar. 23-25, 1998, pp. 355-376.
Martin et al., "Development Tools for the Open Agent Architecture", Proceedings of the International Conference on the Practical Application of Intelligent Agents and Multi-Agent Technology, Apr. 1996, pp. 1-17.
Martin et al., "Information Brokering in an Agent Architecture", Proceedings of the second International Conference on the Practical Application of Intelligent Agents and Multi-Agent Technology, Apr. 1997, pp. 1-20.
Martin et al., "Transportability and Generality in a Natural-Language Interface System", Proceedings of the Eight International Joint Conference on Artificial Intelligence, Technical Note 293, Aug. 8-12, 1983, 21 pages.
Matiasek et al., "Tamic-P: A System for NL Access to Social Insurance Database", 4th International Conference on Applications of Natural Language to Information Systems, Jun. 17-19, 1999, 7 pages.
McGuire et al., "SHADE: Technology for Knowledge-Based Collaborative Engineering", Journal of Concurrent Engineering~r Applications and Research (CERA), 1993, 18 pages.
Meng et al., "Wheels: A Conversational System in the Automobile Classified Domain", Proceedings Fourth International Conference on Spoken Language, 1996. ICSLP 96, Oct. 1996, pp. 542-545.
Michos et al., "Towards an Adaptive Natural Language Interface to Command Languages", Natural Language Engineering, vol. 2, No. 3, 1996, pp. 191-209.
Milstead et al., "Metadata: Cataloging by Any Other Name", Online, Information Today, Inc., Jan. 1999, 18 pages.
Milward et al., "D2.2: Dynamic MultimodalInterface Reconfiguration" Talk and Look: Tools for Ambient Linguistic Knowledge, IST-507802 Deliverable D2.2, Aug. 8, 2006, 69 pages.
Minker et al., "Hidden Understanding Models for Machine Translation", Proceedings of ETRW on Interactive Dialogue in Multi-Modal Systems, Jun. 1999, pp. 1-4.
Mitra et al., "A Graph-Oriented Model for Articulation of Ontology Interdependencies", Lecture Notes in Computer Science, vol. 1777, 2000, pp. 86-100.
Modi et al., "CMRadar: A Personal Assistant Agent for Calendar Management", AAAI, Intelligent Systems Demonstrations, 2004, pp. 1020-1021.
Moore et al., "Combining Linguistic and Statistical Knowledge Sources in Natural-Language Processing for ATIS", SRI International, ArtificialIntelliqence Center, 1995, 4 pages.
Moore et al., "SRI's Experience with the ATIS Evaluation", Proceedings of the workshop on Speech and Natural Language, Jun. 24-27, 1990, pp. 147-148.
Moore et al., "The Information Warefare Advisor: An Architecture for Interacting with Intelligent Agents Across the Web", Proceedings of Americas Conference on Information Systems (AMCIS), Dec. 31, 1998, pp. 186-188.
Moore, Robert C., "Handling Complex Queries in a Distributed Data Base", SRI International, Technical Note 170, Oct. 8, 1979, 38 pages.
Moore, Robert C., "Practical Natural-Language Processing by Computer", SRI International, Technical Note 251, Oct. 1981, 34 pages.
Moore, Robert C., "The Role of Logic in Knowledge Representation and Commonsense Reasoning", SRI International, Technical Note 264, Jun. 1982, 19 pages.
Moore, Robert C., "Using Natural-Language Knowledge Sources in Speech Recognition", SRI International, Artificial Intelligence Center, Jan. 1999, pp. 1-24.
Moran et al., "Intelligent Agent-based User Interfaces", Proceedings of International Workshop on Human Interface Technology, Oct. 12-13, 1995, pp. 1-4.
Moran et al., "Multimodal User Interfaces in the Open Agent Architecture", International Conference on Intelligent User Interfaces (IUI97), 1997, 8 pages.
Moran, Douglas B., "Quantifier Scoping in the SRI Core Language Engine", Proceedings of the 26th Annual Meeting on Association for Computational Linguistics, 1988, pp. 33-40.
Morgan, B., "Business Objects (Business Objects for Windows) Business Objects Inc.", DBMS, vol. 5, No. 10, Sep. 1992, 3 pages.
Motro, Amihai, "Flex: A Tolerant and Cooperative User Interface to Databases", IEEE Transactions on Knowledge and Data Engineering, vol. 2, No. 2, Jun. 1990, pp. 231-246.

(56) References Cited

OTHER PUBLICATIONS

Mountford et al., "Talking and Listening to Computers", The Art of Human-Computer Interface Design, Copyright © 1990 Apple Computer, Inc. Addison-Wesley Publishing Company, Inc, 1990, 17 pages.
Mozer, Michael C., "An Intelligent Environment Must be Adaptive", IEEE Intelligent Systems, Mar./Apr. 1999, pp. 11-13.
Muhlhauser, Max, "Context Aware Voice User Interfaces for Workflow Support", 2007, 254 pages.
Murty, "Combining Evidence from Residual Phase and MFCC Features for Speaker Recognition", IEEE Signal Processing Letters, vol. 13, No. 1, Jan. 2006, pp. 52-55.
Murveit et al., "Integrating Natural Language Constraints into HMM-based Speech Recognition", 1990 International Conference on Acoustics, Speech, and Signal Processing, Apr. 3-6, 1990, 5 pages.
Murveit et al., "Speech Recognition in SRI's Resource Management and ATIS Systems", Proceedings of the Workshop on Speech and Natural Language, 1991, pp. 94-100.
Nakagawa et al., "Speaker Recognition by Combining MFCC and Phase Information", IEEE International Conference on Acoustics Speech and Signal Processing ICASSP, Mar. 14-19, 2010, pp. 4502-4505.
Naone, Erica, "TR10: Intelligent Software Assistant", Technology Review, Mar.-Apr. 2009, 2 pages.
Neches et al., "Enabling Technology for Knowledge Sharing", Fall, 1991, pp. 37-56.
Niesler et al., "A Variable-Length Category-Based N-Gram Language Model", IEEE International Conference on Acoustics, Speech, and Signal Processing (ICASSP'96), vol. 1, May 7-10, 1996, pp. 164-167.
Noth et al., "Verbmobil: The Use of Prosody in the Linguistic Components of a Speech Understanding System", IEEE Transactions on Speech and Audio Processing, vol. 8, No. 5, Sep. 2000, pp. 519-532.
Odubiyi et al., "SAIRE—A Scalable Agent-Based Information Retrieval Engine", Proceedings of the First International Conference on Autonomous Agents, 1997, 12 pages.
Ward et al., "Recent Improvements in the CMU Spoken Language Understanding System", ARPA Human Language Technology Workshop, 1994, pp. 213-216.
Ward, Wayne, "The CMU Air Travel Information Service: Understanding Spontaneous Speech", Proceedings of the Workshop on Speech and Natural Language, HLT '90, 1990, pp. 127-129.
Warren, "An Efficient Easily Adaptable System for Interpreting Natural Language Queries", American Journal of Computational Linguistics, vol. 8, No. 3-4, Jul.-Dec. 1982, pp. 110-119.
Weizenbaum, Joseph, "ELIZA—A Computer Program for the Study of Natural Language Communication Between Man and Machine", Communications of the ACM, vol. 9, No. 1, Jan. 1966, pp. 36-45.
Werner et al., "Prosodic Aspects of Speech," Universite de Lausanne, Switzerland, 1994, Fundamentals of Speech Synthesis and Speech Recognition: Basic Concepts, State of the Art, and Future Challenges, 1994, pp. 23-40.
Winiwarter et al., "Adaptive Natural Language Interfaces to FAQ Knowledge Bases", Proceedings of 4th International Conference on Applications of Natural Language to Information Systems, Austria, Jun. 17-19, 1999, 22 pages.
Wolff, Mark, "Poststructuralism and the ARTFUL Database: Some Theoretical Considerations", Information Technology and Libraries, vol. 13, No. 1, Mar. 1994, 10 pages.
Wu et al., "KDA: A Knowledge-based Database Assistant", Data Engineering, Proceeding of the Fifth International Conference on Engineering (IEEE Cat No. 89CH2695-5), Feb. 6-10, 1989, pp. 402-409.
Wu, Min, "Digital Speech Processing and Coding", ENEE408G Capstone-Multimedia Signal Processing, Spring 2003, Lecture-2 Course Presentation, University of Maryland, College Park, 2003, pp. 1-8.
Wu, Min, "Speech Recognition, Synthesis, and H.C.I.", ENEE408G Capstone-Multimedia Signal Processing, Spring 2003, Lecture-3 course presentation, University of Maryland, College Park, 2003, pp. 1-11.
Wyle, M. F., "A Wide Area Network Information Filter", In Proceedings of First International Conference on Artificial Intelligence on Wall Street, Oct. 9-11, 1991, pp. 10-15.
Yang et al., "Smart Sight: A Tourist Assistant System", Proceedings of Third International Symposium on Wearable Computers, 1999, 6 pages.
Yankelovich et al., "Intermedia: The Concept and the Construction of a Seamless Information Environment", IEEE Computer Magazine, Jan. 1988, pp. 81-96.
Yoon et al., "Letter-to-Sound Rules for Korean", Department of Linguistics, The Ohio State University, 2002, 4 pages.
Zeng et al., "Cooperative Intelligent Software Agents", The Robotics Institute, Carnegie-Mellon University, Mar. 1995,13 pages.
Zhao Leon., "Intelligent Agents for Flexible Workflow Systems", Proceedings of the Americas Conference on Information Systems (AMCIS), 1998, pp. 237-239.
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zovato et al., "Towards Emotional Speech Synthesis: A Rule based Approach", Proceedings 5th ISCA Speech Synthesis Workshop—Pittsburgh, 2004, pp. 219-220.
Zue et al., "From Interface to Content: Translingual Access and Delivery of On-Line Information", EUROSPEECH, 1997, 4 pages.
Zue et al., "Jupiter: A Telephone-Based Conversational Interface for Weather Information", IEEE Transactions on Speech and Audio Processing, Jan. 2000, pp. 100-112.
Zue et al., "Pegasus: A Spoken Dialogue Interface for On-Line Air Travel Planning", Elsevier, Speech Communication, vol. 15, 1994, 10 pages.
Zue et al., "The Voyager Speech Understanding System: Preliminary Development and Evaluation", Proceedings of IEEE 1990 International Conference on Acoustics, Speech, and Signal Processing, 1990, pp. 73-76.
Zue, Victor, "Conversational Interfaces: Advances and Challenges", Spoken Language System Group <http://www.cs.cmu.edu/-dod/papers/zue97.pdf>, Sep. 1997, 10 pages.
Zue, Victor W., "Toward Systems that Understand Spoken Language", ARPA Strategic Computing Institute, Feb. 1994, pp. 51-59.
Savoy, J., "Searching Information in Hypertext Systems Using Multiple Sources of Evidence", International Journal of Man-Machine Studies, vol. 38, No. 6, Jun. 1996, pp. 1017-1030.
Scagliola, C., "Language Models and Search Algorithms for Real-Time Speech Recognition", International Journal of Man-Machine Studies, vol. 22, No. 5, 1985, pp. 523-547.
Schmandt et al., "Augmenting a Window System with Speech Input", IEEE Computer Society, Computer, vol. 23, No. 8, Aug. 1990, pp. 50-56.
Ward et al., "A Class Based Language Model for Speech Recognition", Conference Proceedings International Conference on Acoustics, Speech, and Signal Processing, 1996, ICASSP-96, pp. 416-418.
Schütze, H., "Dimensions of Meaning", Proceedings of Supercomputing'92 Conference, Nov. 16-20, 1992, 10 pages.
Seneff et al., "A New Restaurant Guide Conversational System: Issues in Rapid Prototyping for Specialized Domains", Proceedings of Fourth International Conference on Spoken Language, 1996. ICSLP 96, 1996, pp. 665-668.
Sharoff et al., "Register-domain Separation as a Methodology for Development of Natural Language Interfaces to Databases", Proceedings of Human-Computer Interaction (INTERACT'99), 1999, 7 pages.
Sheth et al., "Evolving Agents for Personalized Information Filtering", In Proceedings of the Ninth Conference on Artificial Intelligence for Applications, Mar. 1-5, 1993, 9 pages.
Sheth et al., "Relationships at the Heart of Semantic Web: Modeling, Discovering, and Exploiting Complex Semantic Relation-

(56) References Cited

OTHER PUBLICATIONS ships", Enhancing the Power of the Internet: Studies in Fuzziness and Soft Computing, Oct. 13, 2002, pp. 1-38.
Shikano et al., "Speaker Adaptation Through Vector Quantization", IEEE International Conference on Acoustics, Speech, and Signal Processing (ICASSP'86), vol. 11, Apr. 1986, 4 pages.
Shimazu et al., "CAPIT: Natural Language Interface Design Tool with Keyword Analyzer and Case-Based Parser,", NEG Research & Development, vol. 33, No. 4, Oct. 1992, 11 pages.
Shinkle, L., "Team User's Guide", SRI International, Artificial Intelligence Center, Nov. 1984, 78 pages.
Shklar et al., "Info Harness: Use of Automatically Generated Metadata for Search and Retrieval of Heterogeneous Information", 1995 Proceedings of CAiSE'95, Finland, 1995.
Sigurdsson et al., "Mel Frequency Cepstral Coefficients: An Evaluation of Robustness of MP3 Encoded Music", In Proceedings of the 7th International Conference on Music Information Retrieval ISMIR, 2006, 4 pages.
Silverman et al., "Using a Sigmoid Transformation for Improved Modeling of Phoneme Duration", Proceedings of the IEEE International Conference on Acoustics, Speech, and Signal Processing, Mar. 15-19, 1999, 5 pages.
Simonite, Tom, "One Easy Way to Make Siri Smarter", Technology Review, Oct. 18, 2011, 2 pages.
Singh, N., "Unifying Heterogeneous Information Models", Communications of the ACM, 1998, 13 pages.
SRI International, "The Open Agent Architecture.TM. 1.0 Distribution", Open Agent Architecture (OAA), 1999, 2 pages.
SRI2009, "SRI Speech: Products: Software Development Kits: EduSpeak", available a <http://web.archive.org/web/20090828084033/http://www.speechatsri.com/products/eduspeak> shtml., 2009, 2 pages.
Starr et al., "Knowledge-Intensive Query Processing", Proceedings of the 5th KRDB Workshop, Seattle, May 31, 1998, 6 pages.
Stent et al., "The CommandTalk Spoken Dialogue System", SRI International, 1999, pp. 183-190.
Stern et al., "Multiple Approaches to Robust Speech Recognition", Proceedings of Speech and Natural Language Workshop, 1992, 6 pages.
Stickel, "A Nonclausal Connection-Graph Resolution Theorem-Proving Program", Proceedings of AAAI'82, 1982, pp. 1-13.
Sugumaran, V., "A Distributed Intelligent Agent-Based Spatial Decision Support System", Proceedings of the Americas Conference on Information systems (AMCIS), Dec. 31, 1998, 4 pages.
Sycara et al., "Coordination of Multiple Intelligent Software Agents", International Journal of Cooperative Information Systems (IJCIS), vol. 5, No. 2 & 3, Jun. & Sep. 1996, 33 pages.
Sycara et al., "Distributed Intelligent Agents", IEEE Expert, vol. 11, No. 6, Dec. 1996, 32 pages.
Sycara et al., "Dynamic Service Matchmaking Among Agents in Open Information Environments", SIGMOD Record, 1999, 7 pages.
Sycara et al., "The RETSINA MAS Infrastructure", Autonomous Agents and Multi-Agent Systems, vol. 7, 2003, 20 pages.
Tenenbaum et al., "Data Structure Using Pascal", 1981 Prentice-Hall, Inc, 1981, 34 pages.
Textndrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
Tofel et al., "SpeakToIt: A Personal Assistant for Older iPhones, iPads", Apple News, Tips and Reviews, Feb. 9, 2012, 7 pages.
Tsai et al., "Attributed Grammar—A Tool for Combining Syntactic and Statistical Approaches to Pattern Recognition", IEEE Transactions on Systems, Man, and Cybernetics, vol. SMC-10, No. 12, Dec. 1980, 13 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech, and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Tyson et al., "Domain-Independent Task Specification in the TACITUS Natural Language System", SRI International, Artificial Intelligence Center, May 1990, 16 pages.
Udell, J., "Computer Telephony", BYTE, vol. 19, No. 7, Jul. 1, 1994, 9 pages.
Van Santen, J. P., "Contextual Effects on Vowel Duration", Journal Speech Communication, vol. 11, No. 6, Dec. 1992, 34 pages.
Vepa et al., "New Objective Distance Measures for Spectral Discontinuities in Concatenative Speech Synthesis", In Proceedings of the IEEE 2002 Workshop on Speech Synthesis, 2002, 4 pages.
Verschelde, J., "MATLAB Lecture 8. Special Matrices in MATLAB,", UIC Dept. of Math., Stat. & C.S., MCS 320, Introduction to Symbolic Computation, Nov. 23, 2005, 4 pages.
Vingron, M., "Near-Optimal Sequence Alignment", Deutsches Krebsforschungszentrum (DKFZ), Abteilung Theoretische Bioinformatik, Heidelberg, Germany, Jun. 1996, 20 pages.
Vlingo, "Vlingo Launches Voice Enablement Application on Apple App Store", Press Release, Dec. 3, 2008, 2 pages.
Vlingo Lncar, "Distracted Driving Solution with Vlingo InCar", YouTube by Vlingo Voice on (Oct. 6, 2010) 2:38 minute video uploaded to Retrieved from Internet on Jun. 6, 2012<http://www.youtube.com/watch?v=Vqs8XfXxgz4?, 2 pages.
Voiceassist, "Send Text, Listen to and Send E~Mail By Voice", YouTube Video available at <http://www.youtube.com/watch?v=0tEU61nHHA4>, Jul. 30, 2009, 1 page.
Voiceonthego, "Voice on the Go (BlackBerry)", YouTube available at <http://www.youtube.com/watch?v=pJqpWgQS98w>, Jul. 27, 2009, 1 page.
Wahlster et al., "Smartkom: Multimodal Communication with a Life-Like Character,", EUROSPEECH—Scandinavia, 7th European Conference on Speech Communication and Technology, 2001, 5 pages.
Waldinger et al., "Deductive Question Answering from Multiple Resources", New Directions in Question Answering, published by AAAI, Menlo Park, 2003, 22 pages.
Walker et al., "Natural Language Access to Medical Text", SRI International, Artificial Intelligence Center, Mar. 1981, 23 pages.
Waltz, D., "An English Language Question Answering System for a Large Relational Database", © 1978 ACM, vol. 21, No. 7, 1978, 14 pages.
Bahl et al., "Multonic Markov Word Models for Large Vocabulary Continuous Speech Recognition", IEEE Transactions on Speech and Audio Processing, vol. 1, No. 3, Jul. 1993, 11 pages.
Bahl et al., "Speech Recognition with Continuous-Parameter Hidden Markov Models", In Proceeding of International Conference on Acoustics, Speech, and Signal Processing (ICASSP'88), vol. 1, Apr. 11-14, 1988, 8 pages.
Banbrook, M., "Nonlinear Analysis of Speech from a Synthesis Perspective", A Thesis Submitted for the Degree of Doctor of Philosophy, The University of Edinburgh, Oct. 15, 1996, 35 pages.
Bear et al., "A System for Labeling Self-Repairs in Speech", SRI International, Technical Note 522, Feb. 22, 1993, pp. 1-8.
Bear et al., "Detection and Correction of Repairs in Human-Computer Dialog", SRI International, Technical Note 518, May 5, 1992, pp. 1-10.
Bear et al., "Integrating Multiple Knowledge Sources for Detection and Correction of Repairs in Human-Computer Dialog", Proceedings of the 30th annual meeting on Association for Computational Linguistics (ACL), 1992, 8 pages.
Bear et al., "Using Information Extraction to Improve Document Retrieval", SRI International, Jan. 9, 1998, pp. 1-11.
Belaid et al., "A Syntactic Approach for Handwritten Mathematical Formula Recognition", IEEE Transactions on Pattern Analysis and Machine Intelligence, vol. PAMI-6, No. 1, Jan. 1984, 7 pages.
Bellegarda et al., "A Latent Semantic Analysis Framework for Large-Span Language Modeling", 5th European Conference on Speech, Communication and Technology, (EUROSPEECH'97), Sep. 22-25, 1997, 4 pages.

(56) References Cited

OTHER PUBLICATIONS

Bellegarda et al., "A Multispan Language Modeling Framework for Large Vocabulary Speech Recognition", IEEE Transactions on Speech and Audio Processing vol. 6, No. 5, Sep. 1998, 12 pages.
Bellegarda et al., "A Novel Word Clustering Algorithm Based on Latent Semantic Analysis", In Proceedings of the IEEE International Conference on Acoustics, Speech, and Signal Processing (ICASSP'96}, vol. 1, 1996, 4 pages.
Bellegarda et al., "Experiments Using Data Augmentation for Speaker Adaptation", International Conference on Acoustics, Speech, and Signal Processing (ICASSP'95), May 9-12, 1995, 4 pages.
Bellegarda et al., "On-Line Handwriting Recognition Using Statistical Mixtures", Advances in Handwriting and Drawings: A Multidisciplinary Approach, Europia, 6th International IGS Conference on Handwriting and Drawing, Paris-France, Jul. 1993, 11 pages.
Bellegarda et al., "Performance of the IBM Large Vocabulary Continuous Speech Recognition System on the ARPA Wall Street Journal Task", Signal Processing VII: Theories and Applications, © 1994 European Association for Signal Processing, 1994, 4 pages.
Bellegarda et al., "The Metamorphic Algorithm: A Speaker Mapping Approach to Data Augmentation", IEEE Transactions on Speech and Audio Processing, vol. 2, No. 3, Jul. 1994, 8 pages.
Bellegarda, J. R., "Exploiting Both Local and Global Constraints for Multi-Span Statistical Language Modeling", Proceeding of the 1998 IEEE International Conference on Acoustics, Speech, and Signal Processing (1CASSP'98), vol. 2, May 12-15 1998, 5 pages.
Bellegarda, J. R., "Exploiting Latent Semantic Information in Statistical Language Modeling", Proceedings of the IEEE, vol. 88, No. 8, Aug. 2000, 18 pages.
Bellegarda, J. R., "Interaction-Driven Speech Input—A Data-Driven Approach to the Capture of Both Local and Global Language Constraints", available online at <http:// old.sig.chi.ora/bulletin/1998.2/bellegarda.html>, 1992, 7 pages.
Bellegarda, J. R., "Large Vocabulary Speech Recognition with Multispan Statistical Language Models", IEEE Transactions on Speech and Audio Processing, vol. 8, No. 1, Jan. 2000, 9 pages.
Belvin et al., "Development of the HRL Route Navigation Dialogue System", In Proceedings of the First International Conference on Human Language Technology Research, Paper, 2001, 5 pages.
Berry et al., "PTIME: Personalized Assistance for Calendaring", ACM Transactions on Intelligent Systems and Technology, vol. 2, No. 4, Article 40, Jul. 2011, pp. 1-22.
Berry et al., "Task Management under Change and Uncertainty Constraint Solving Experience with the CALO Project", Proceedings of CP'05 Workshop on Constraint Solving under Change, 2005, 5 pages.
Black et al., "Automatically Clustering Similar Units for Unit Selection in Speech Synthesis", In Proceedings of Eurospeech 1997, vol. 2, 1997, 4 pages.
Blair et al., "An Evaluation of Retrieval Effectiveness for a Full-Text Document-Retrieval System", Communications of the ACM, vol. 28, No. 3, Mar. 1985, 11 pages.
Bobrow et al., "Knowledge Representation for Syntactic/Semantic Processing", AAA-80 Proceedings, 1980, pp. 316-323.
Bouchou et al., "Using Transducers in Natural Language Database Query", Proceedings of 4th International Conference on Applications of Natural Language to Information Systems, Austria, Jun. 17-19, 1999, 17 pages.
Bratt et al., "The SRI Telephone-based ATIS System", Proceedings of ARPA Workshop on Spoken Language Technology, 1995, 3 pages.
Briner, L. L., "Identifying Keywords in Text Data Processing", In Zelkowitz, Marvin V., ED, Directions and Challenges, 15th Annual Technical Symposium, Gaithersbury, Maryland, Jun. 17, 1976, 7 pages.
Bulyko et al., "Joint Prosody Prediction and Unit Selection for Concatenative Speech Synthesis", Electrical Engineering Department, University of Washington, Seattle, 2001, 4 pages.

Burke et al., "Question Answering from Frequently Asked Question Files", AI Magazine, Spring, vol. 18, No. 2, 1997, pp. 57-66.
Burns et al., "Development of a Web-Based Intelligent Agent for the Fashion Selection and Purchasing Process via Electronic Commerce", Proceedings of the Americas Conference on Information system (AMCIS), Dec. 31, 1998, pp. 140-142.
Bussey et al., "Service Architecture, Prototype Description, and Network Implications of a Personalized Information Grazing Service", INFOCOM'90, Ninth Annual Joint Conference of the IEEE Computer and Communication Societies, available online at <http:I/slrohall.comloublications/>, Jun. 3-7, 1990, 8 pages.
Bussler et al., "Web Service Execution Environment (WSMX)", available online at <http://www.w3.org/Submission/WSMX/>, retrieved from Internet on Sep. 17, 2012, 29 pages.
Butcher, Mike, "EVI Arrives in Town to go Toe-to-Toe with Siri", TechCrunch, Jan. 23, 2012, 2 pages.
Buzo et al., "Speech Coding Based Upon Vector Quantization", IEEE Transactions on Acoustics, Speech, and Signal Processing, vol. Assp-28, No. 5, Oct. 1980, 13 pages.
Caminero-Gil et al., "Data-Driven Discourse Modeling for Semantic Interpretation", In Proceedings of the IEEE International Conference on Acoustics, Speech, and Signal Processing, May 7-10, 1996, 6 pages.
Carter et al., "The Speech-Language Interface in the Spoken Language Translator", SRI International, Nov. 23, 1994, pp. 1-9.
Carter, David M., "Lexical Acquisition in the Core Language Engine", Proceedings of the Fourth Conference of the European Chapter of the Association for Computational Linguistics, 1989, pp. 137-144.
Cawley, "The Application of Neural Networks to Phonetic Modelling", PhD Thesis, University of Essex, Mar. 1996, 13 pages.
Chai et al., "Comparative Evaluation of a Natural Language Dialog Based System and a Menu Driven System for Information Access: a Case Study", Proceedings of the International Conference on Multimedia Information Retrieval (RIAO), Apr. 2000, 11 pages.
Chang et al., "A Segment-based Speech Recognition System for Isolated Mandarin Syllables", Proceedings TEN CON '93, IEEE Region 10 conference on Computer, Communication, Control and Power Engineering, vol. 3, Oct. 19-21, 1993, pp. 317-320.
Chen, Yi, "Multimedia Siri Finds and Plays Whatever You Ask for", PSFK Report, Feb. 9, 2012, 9 pages.
Cheyer et al., "Demonstration Video of Multimodal Maps Using an Agent Architecture", available online at <http://www.youtube.com/watch?v=x3TptMGT9EQ&feature=youtu.be>, published on 1996, 6 pages.
Cheyer et al., "Demonstration Video of Multimodal Maps Using an Open-Agent Architecture", available online at <http://www.youtube.com/watch?v=JUxaKnyZyM&feature=youtu.be>, published on 1996, 6 pages.
Cheyer et al., "Multimodal Maps: An Agent-based Approach", International Conference on Cooperative Multimodal Communication, Jun. 9, 1995, pp. 1-15.
Cheyer et al., "Spoken Language and Multimodal Applications for Electronic Realties", Virtual Reality, vol. 3, 1999, pp. 1-15.
Cheyer et al., "The Open Agent Architecture,", Autonomous Agents and Multi-Agent systems, vol. 4, Mar. 1, 2001, 6 pages.
Cheyer et al., "The Open Agent Architecture: Building Communities of Distributed Software Agents", Artificial Intelligence Center SRI International, Power Point presentation, available online at <http://www.ai.sri.com/~oaa>, Feb. 21, 1998, 25 pages.
Cheyer, A., "Demonstration Video of Vanguard Mobile Portal", available online at <http://www.youtube.com/watch?v=ZTMsvg_0oLQ&feature=youtu.be>, published on 2004, 10 pages.
Cheyer, Adam, "A Perspective on AI & Agent Technologies for SCM", VerticaiNet presentation, 2001, 22 pages.
"Integrated Audio-Graphics User Interface", IBM Technical Disclosure Bulletin, vol. 33, No. 11, Apr. 1991, pp. 368-371.
"Interactive Voice", available online at <http://www.helloivee.com/company/> retrieved from internet on Feb. 10, 2014, 2 pages.
"Meet Ivee Your Wi-Fi Voice Activated Assistant", available online at <http://www.helloivee.com/> retrieved from Internet on Feb. 10, 2014, 8 pages.

(56) References Cited

OTHER PUBLICATIONS

"Mel Scale", Wikipedia the Free Encyclopedia, last modified on Oct. 13, 2009 and retrieved on Jul. 28, 2010, available online <http://en.wikipedia.org/wiki/Mel_scale>, 2 pages.
"Minimum Phase", Wikipedia the free Encyclopedia, Last Modified on Jan. 12, 2010 and retrieved on Jul. 28, 2010, available online at <http://en.wikipedia.org/wiki/Minimum_phase>, 8 pages.
"Speech Editor", IBM Technical Disclosure Bulletin, vol. 29, No. 10, Mar. 1987, pp. 4512-4514.
"Speech Recognition with Hidden Markov Models of Speech Waveforms", IBM Technical Disclosure Bulletin, vol. 34, No. 1, Jun. 1991, pp. 7-16.
Ex-Parte Quayle Action received for U.S. Appl. No. 12/244,713, dated Sep. 10, 2012, 5 pages.
Non Final Office Action received for U.S. Appl. No. 12/244,713, dated Dec. 23, 2011, 11 pages.
Bahl et al., "Large Vocabulary Natural Language Continuous Speech Recognition", In Proceedings of 1989 International Conference on Acoustics, Speech, and Signal Processing, vol. 1, May 23-26, 1989, 6 pages.
Notice of Allowance received for U.S. Appl. No. 121244,713, dated Aug. 7, 2012, 7 pages.
Notice of Allowance received for U.S. Appl. No. 12/244,713, dated May 10, 2012, 5 pages.
Final Office Action received for U.S. Appl. No. 13/053,144, dated Nov. 19, 2013, 24 pages.
Non Final Office Action received for U.S. Appl. No. 13/053,144, dated Mar. 22, 2013, 18 pages.
Notice of Allowance received for U.S. Appl. No. 13/480,422, dated Jul. 19, 2012, 9 pages.
Supplemental Notice of Allowance received for U.S. Appl. No. 13/480,422, dated Sep. 27, 2012, 2 pages.
Notice of Allowance received for U.S. Appl. No. 13/604,556, dated Apr. 1, 2013, 9 pages.
Notice of Allowance received for U.S. Appl. No. 13/604,556, dated Jul. 31, 2013, 9 pages.
Acero et al., "Environmental Robustness in Automatic Speech Recognition", International Conference on Acoustics, Speech, and Signal Processing (ICASSP'90), Apr. 3-6, 1990, 4 pages.
Acero et al., "Robust Speech Recognition by Normalization of the Acoustic Space", International Conference on Acoustics, Speech, and Signal Processing, 1991, 4 pages.
Agnes et al., "Spoken Language Translator: First-Year Report", SICS Research Report, Jan. 1994, 161 pages.
Ahlbom et al., "Modeling Spectral Speech Transitions Using Temporal Decomposition Techniques", IEEE International Conference of Acoustics, Speech, and Signal Processing (ICASSP'87), vol. 12, Apr. 1987, 4 pages.
Aikawa et al., "Speech Recognition Using Time-Warping Neural Networks", Proceedings of the 1991 IEEE Workshop on Neural Networks for Signal Processing, Sep. 30 to Oct. 1, 1991, 10 pages.
Alfred App, available online at <http://www.alfredapp.com/>, retrieved on Feb. 8, 2012, 5 pages.
Allen, James, "Natural Language Understanding", 2nd Edition, 1995, 671 pages.
Alshawi et al., "CLARE: A Contextual Reasoning and Cooperative Response Framework for the Core Language Engine—Final Report", SRI International, available online at <http://www.cam.sri.com/tr/crc028/paper.ps. Z>, Dec. 1992, pp. 1-272.
Alshawi et al., "Declarative Derivation of Database Queries from Meaning Representations", Proceedings of the BANKAI Workshop, Oct. 1991, pp. 1-12.
Alshawi et al., "Logical Forms in the Core Language Engine", Proceedings of the 27th Annual Meeting of the Association for Computational Linguistics, 1989, pp. 25-32.
Alshawi et al., "Overview of the Core Language Engine", Proceedings of Future Generation Computing Systems, Sep. 1988, pp. 1-13.
Alshawi, Hiyan, "Translation and Monotonic Interpretation/Generation", SRI International, available online at <http://www.cam.sri.com/tr/crc024/paper.ps.Z>, Jul. 1992, pp. 1-18.

Ambite et al., "Design and Implementation of the CALO Query Manager", American Association for Artificial Intelligence, 2006, 8 pages.
Ambite et al., "Integration of Heterogeneous Knowledge Sources in the CALO Query Manager", The 4th International Conference on Ontologies, DataBases, and Applications of Semantics (ODBASE), 2005, 18 pages.
Anastasakos et al., "Duration Modeling in Large Vocabulary Speech Recognition", International Conference on Acoustics, Speech, and Signal Processing (ICASSP'95), May 9-12, 1995, 4 pages.
Anderson et al., "Syntax-Directed Recognition of Hand-Printed Two-Dimensional Mathematics", In Proceedings of Symposium on Interactive Systems for Experimental Applied Mathematics: Proceedings of the Association for Computing Machinery Inc. Symposium, 1967, 12 pages.
Anonymous, "Speaker Recognition", Wikipedia, the Free Enclyclopedia, Nov. 2, 2010, 3 pages.
Ansari et al., "Pitch Modification of Speech using a Low-Sensitivity Inverse Filter Approach", IEEE Signal Processing Letters, vol. 5, No. 3, Mar. 1998, 3 pages.
Anthony et al., "Supervised Adaption for Signature Verification System", IBM Technical Disclosure, Jun. 1, 1978, 3 pages.
Appelt et al., "Fastus: A Finite-state Processor for Information Extraction from Real-world Text", Proceedings of IJCAI, 1993, 8 pages.
Appelt et al., "SRI International Fastus System MUC-6 Test Results and Analysis", SRI International, 1995, 12 pages.
Appelt et al., "SRI: Description of the JV-FASTUS System Used for MUC-5", SRI International, 1993, pp. 1-19.
Apple Computer, "Guide Maker User's Guide", © Apple Computer, Inc., Apr. 27, 1994, 8 pages.
Apple Computer, "Introduction to Apple Guide", © Apple Computer, Inc., Apr. 28, 1994, 20 pages.
Apple Computer, "Knowledge Navigator", available online at <http://www.youtube.com/watch?v=QRH8eimU_20>, Uploaded on Apr. 29, 2008, 7 pages.
Archbold et al., "A Team User's Guide", SRI International, Technical Note 254, Dec. 21, 1981, 70 pages.
Asanovic et al., "Experimental Determination of Precision Requirements for Back- Propagation Training of Artificial Neural Networks", In Proceedings of the 2nd International Conference of Microelectronics for Neural Networks, 1991, www.ICSI.Berkelev. EDU, 1991, 7 pages.
Atal et al., "Efficient Coding of LPC Parameters by Temporal Decomposition", IEEE International Conference on Acoustics, Speech, and Signal Processing (ICASSP'83), Apr. 1983, 4 pages.
Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.
Bahl et al., "A Tree-Based Statistical Language Model for Natural Language Speech Recognition", IEEE Transactions on Acoustics, Speech and Signal Processing, vol. 37, No. Jul. 1989, 8 pages.
Bahl et al., "Acoustic Markov Models Used in the Tangora Speech Recognition System", In Proceeding of International Conference on Acoustics, Speech, and Signal Processing (ICASSP'88), vol. 1, Apr. 11-14, 1988, 4 pages.
Bulyko et al., "Error-Correction Detection and Response Generation in a Spoken Dialogue System", Speech Communication, vol. 45, 2005, pp. 271-288.
Owei et al., "Natural Language Query Filtration in the Conceptual Query Language", IEEE, 1997, pp. 539-549.
Pannu et al., "A Learning Personal Agent for Text Filtering and Notification", Proceedings of the International Conference of Knowledge Based Systems, 1996, pp. 1-11.
Papadimitriou et al., "Latent Semantic Indexing: A Probabilistic Analysis", available online at <http://citeseerx.ist.psu.edu/messaqes/downloadsexceeded.html>, Nov. 14, 1997, 21 pages.
Parsons, T. W., "Voice and Speech Processing", Pitch and Formant Estimation © 1987, McGraw-Hill, Inc., ISBN: 0-07-0485541-0, 1987, 15 pages.
Parsons T. W., "Voice and Speech Processin", Linguistics and Technical Fundamentals, Articulatory Phonetics and Phonemics,© 1987 McGraw-Hill, Inc., ISBN: 0-07-0485541-0, 5 pages.

(56) References Cited

OTHER PUBLICATIONS

International Preliminary Report on Patentability received for PCT Patent Application No. PCT/US1993/012637, dated Apr. 10, 1995, 7 pages.
International Preliminary Report on Patentability received for PCT Patent Application No. PCT/US1993/012666, dated Mar. 1, 1995, 5 pages.
International Search Report received for PCT Patent Application No. PCT/US1993/012666, dated Nov. 9, 1994, 8 pages.
International Preliminary Report on Patentability received for PCT Patent Application No. PCT/US1994/011011, dated Feb. 28, 1996, 4 pages.
International Search Report received for PCT Patent Application No. PCT/US1994/011011, dated Feb. 8, 1995, 7 pages.
Written Opinion received for PCT Patent Application No. PCT/US1994/011011, dated Aug. 21, 1995, 4 pages.
International Preliminary Report on Patentability received for PCT Patent Application No. PCT/US1995/008369, dated Oct. 9, 1996, 4 pages.
International Search Report received for PCT Patent Application No. PCT/US1995/008369, dated Nov. 8, 1995, 6 pages.
International Search Report and Written Opinion received for PCT Patent Application No. PCT/US2011/020861, dated Nov. 29, 2011, 12 pages.
International Preliminary Report on Patentability received for PCT Patent Application No. PCT/US2012/029810, dated Oct. 3, 2013, 9 pages.
International Search Report and Written Opinion received for PCT Patent Application No. PCT/US2012/029810, dated Aug. 17, 2012, 11 pages.
Pereira, Fernando, "Logic for Natural Language Analysis", SRI International, Technical Note 275, Jan. 1983, 194 pages.
Perrault et al., "Natural-Language Interfaces", SRI International, Technical Note 393, Aug. 22, 1986, 48 pages.
Phoenix Solutions, Inc., A, "Declaration of Christopher Schmandt Regarding the MIT Galaxy System", West Interactive Corporation, a Delaware Corporation, Document 40, Jul. 2, 2010, 162 pages.
Picone, J., "Continuous Speech Recognition Using Hidden Markov Models", IEEE ASSP Magazine, vol. 7, No. 3, Jul. 1990, 16 pages.
Pulman et al., "Clare: A Combined Language and Reasoning Engine", Proceedings of JFIT Conference, available online at <URL: http://www.cam.sri.com/tr/crc042/paper.ps.Z>, 1993, 8 pages.
Rabiner et al., "Fundamental of Speech Recognition", © 1993 AT&T, Published by Prentice-Hall, Inc., ISBN: 0-13-285826-6, 1993, 17 pages.
Rabiner et al., "Note on the Properties of a Vector Quantizer for LPC Coefficients", Bell System Technical Journal, vol. 62, No. 8, Oct. 1983, 9 pages.
Ratcliffe, M., "CiearAccess 2.0 allows SQL searches off-line (Structured Query Language)", ClearAcess Corp., MacWeek, vol. 6, No. 41, Nov. 16, 1992, 2 pages.
Ravishankar, "Efficient Algorithms for Speech Recognition", Doctoral Thesis submitted to School of Computer Science, Computer Science Division, Carnegie Mellon University, Pittsburg, May 15, 1996, 146 pages.
Rayner et al., "Adapting the Core Language Engine to French and Spanish", Cornell University Library, available online at <http://arxiv.org/abs/cmp-lg/9605015.>, May 10, 1996, 9 pages.
Rayner et al., "Deriving Database Queries from Logical Forms by Abductive Definition Expansion", Proceedings of the Third Conference on Applied Natural Language Processing, ANLC, 1992, 8 pages.
Rayner et al., "Spoken Language Translation With Mid-90's Technology: A Case Study", EUROSPEECH, ISCA, available online at <http:// db l p. u n i-trier. de/d b/conf/interspeech/eurospeech 1993. html#RaynerBCCDGKKLPPS93>, 1993, 4 pages.
Rayner, M., "Abductive Equivalential Translation and its application to Natural Language Database Interfacing", Dissertation paper, SRI International, Sep. 1993, 163 pages.
Rayner, M., "Linguistic Domain Theories: Natural-Language Database Interfacing from First Principles", SRI International, Cambridge, 1993, 11 pages.
Remde et al., "SuperBook: An Automatic Tool for Information Exploration-Hypertext?", In Proceedings of Hypertext '87, Nov. 13-15, 1987, 14 pages.
Reynolds, C. F., "On-Line Reviews: A New Application of the HICOM Conferencing System", IEE Colloquium on Human Factors in Electronic Mail and Conferencing Systems, Feb. 3, 1989, 4 pages.
Rice et al., "Monthly Program: Nov. 14, 1995", The San Francisco Bay Area Chapter of ACM SIGCHI, Available at <http://www.baychi.org/calendar/19951114>, Nov. 14, 1995, 2 pages.
Rice et al., "Using the Web Instead of a Window System", Proceedings of the SIGCHI Conference on Human Factors in Computing Systems, CHI'96, 1996, pp. 1-14.
Rigoll, G., "Speaker Adaptation for Large Vocabulary Speech Recognition Systems Using Speaker Markov Models", International Conference on Acoustics, Speech, and Signal Processing (ICASSP'89), May 23-26, 1989, 4 pages.
Riley, M D., "Tree-Based Modelling of Segmental Durations", Talking Machines Theories, Models, and Designs, 1992 © Elsevier Science Publishers B.V., North-Holland, ISBN: 08-444-89115.3, 1992, 15 pages.
Rivlin et al., "Maestro: Conductor of Multimedia Analysis Technologies", SRI International, 1999, 7 pages.
Rivoira et al., "Syntax and Semantics in a Word-Sequence Recognition System", IEEE International Conference on Acoustics, Speech, and Signal Processing (ICASSP'79), Apr. 1979, 5 pages.
Roddy et al., "Communication and Collaboration in a Landscape of B2B eMarketplaces", VerticaiNet Solutions, white paper, Jun. 15, 2000, 23 pages.
Rosenfeld, R., "A Maximum Entropy Approach to Adaptive Statistical Language Modelling", Computer Speech and Language, vol. 10, No. 3, Jul. 1996, 25 pages.
Roszkiewicz, A., "Extending your Apple", Back Talk—Lip Service, A+ Magazine, The Independent Guide for Apple Computing, vol. 2, No. 2, Feb. 1984, 5 pages.
Rudnicky et al., "Creating Natural Dialogs in the Carnegie Mellon Communicator System", Proceedings of Eurospeech, vol. 4, 1999, pp. 1531-1534.
Russell et al., "Artificial Intelligence, a Modern Approac", © 1995 Prentice Hall, Inc., 1995, 121 pages.
Sacerdoti et al., "A Ladder User's Guide (Revised)", SRI International Artificial Intelligence Center, Mar. 1980, 39 pages.
Sagalowicz, D., "AD-Ladder User's Guide", SRI International, Sep. 1980, 42 pages.
Sakoe et al., "Dynamic Programming Algorithm Optimization for Spoken Word Recognition", IEEE Transactions on Acoustics, Speech, and Signal Processing, vol. ASSP-26 No. 1, Feb. 1978, 8 pages.
Salton et al., "On the Application of Syntactic Methodologies in Automatic Text Analysis", Information Processing and Management, vol. 26, No. 1, Great Britain, 1990, 22 pages.
Sameshima et al., "Authorization with security attributes and privilege delegation Access control beyond the ACL", Computer Communications, vol. 20, 1997, 9 pages.
San-Segundo et al., "Confidence Measures for Dialogue Management in the CU Communicator System", Proceedings of Acoustics, Speech, and Signal Processing (ICASSP'00), Jun. 5-9, 2000, 4 pages.
Sato, H., "A Data Model, Knowledge Base, and Natural Language Processing for Sharing a Large Statistical Database,", Statistical and Scientific Database Management, Lecture Notes in Computer Science, vol. 339, 1989, 20 pages.
International Search Report and Written Opinion received for PCT Patent Application No. PCT/US2014/023826, dated Oct. 9, 2014, 13 pages.
International Preliminary Report on Patentability received for PCT Application No. PCT/US2014/023826, dated Sep. 24, 2015, 9 pages.

\* cited by examiner

Usage Log 244

| Words | # of instances |
|---|---|
| a | 2900 |
| and | 3365 |
| be | 4302 |
| in | 2125 |
| the | 5765 |
| ⋮ | ⋮ |
| parte | 17 |
| Favre | 8 |
| szyzgy | 1 |

AUTOMATIC SUPPLEMENTATION OF WORD CORRECTION DICTIONARIES

CROSS-REFERENCE TO RELATED APPLICATIONS

This application claims the benefit of U.S. Provisional Application No. 61/785,703, filed on Mar. 14, 2013, entitled AUTOMATIC SUPPLEMENTATION OF WORD CORRECTION DICTIONARIES, which is hereby incorporated by reference in its entity for all purposes.

TECHNICAL FIELD

The disclosed implementations relate generally to systems and methods for supplementing existing word correction dictionaries on electronic devices with additional dictionaries.

BACKGROUND

Modern electronic devices accept text inputs for many different purposes, such as for composing emails, text messages, documents, and the like. In the case of small, handheld electronic devices, inputting text can be cumbersome, slow, and prone to errors. In particular, the small keyboards used by these devices (including both mechanical and touch-screen-based keyboards) make entering all but the shortest words difficult, and tend to increase spelling, grammar, and punctuation errors. In some cases, electronic devices provide word suggestion functions (e.g., spell-check and/or word-completion functions) to help increase input speed and decrease input errors. These devices typically rely on locally stored dictionaries in order to identify errors and suggest corrections, and/or to suggest complete words based on partially entered text strings. For example, a mobile phone may consult a locally stored dictionary (e.g., a list of words) to determine that the word "teh" is misspelled because it does not appear in the dictionary. The mobile phone may also provide suggestions of words that are in the dictionary that may be suitable replacements for the misspelled word (e.g., "the"). In another example, the mobile phone receives a partial text string (e.g., "dict") and presents candidate complete words for that partial text string (e.g., "dictionary" and "diction").

Handheld devices, however, have limited memory and processing capacity, and it is not practical to store every possible word in a given language on these types of devices just to provide spell-check or word-completion functions. Moreover, many words relate to specialized subjects, and are only used by a subset of the general population. For example, legal words and/or phrases (e.g., "ex parte," "affidavit," "appurtenant," etc.) are less likely to be used by non-lawyers, and names of professional athletes are less likely to be used by non-sports fans. Thus, while a comprehensive dictionary that includes all of these types of words will provide robust spell-check and word suggestion functionalities to all users, it requires more storage space and results in longer processing times. At the same time, the absence of these words can be an inconvenience for users who use them frequently.

SUMMARY

Accordingly, there is a need to provide systems and methods for automatically supplementing on-device dictionaries to provide high quality spell-check and/or word-completion functions without placing undue storage and processing demands on the device. As described herein, existing on-device dictionaries are supplemented with supplemental dictionaries based on individual users' needs. Moreover, determining that a given user would benefit from a particular supplemental dictionary is determined automatically, so the user need not separately request it, or even know that it has been acquired. For example, in some implementations, a device determines that a user routinely inputs words relating to a certain subject (e.g., medical terms, legal terms, etc.), and will download, from a remote server, a supplemental dictionary of words related to that subject. Thus, the user receives robust spell-check and/or word suggestion functionality—even for highly specialized parlance—without requiring storage of thousands of arcane words for which they have no need.

Providing supplemental dictionaries specific to a user's needs helps eliminate several inconveniences associated with traditional spell check and word-completion technologies. First, it prevents false positive errors, such as when correctly spelled words are marked as incorrect or are automatically replaced with other, incorrect words. False positives can be bothersome, as a user's text input can become riddled with nuisance underlines or highlights that are typical of spell checkers. In addition to simply looking unattractive, these make it difficult for a user to spot those words that are actually misspelled as opposed to those that are correctly spelled but are not found in the dictionary. Moreover, providing supplemental dictionaries helps prevent correctly spelled but out-of-dictionary words from being replaced with correctly spelled but incorrect words by an autocorrect feature. For example, autocorrect may convert the correctly spelled phrase "ex parte reexamination" to the nonsensical (though correctly spelled) "ex parts prefabrication." By providing supplemental dictionaries (for legal terms, in this example), such mistakes can be avoided.

Second, by providing supplemental dictionaries, the device will actually identify misspellings of the user's specialized vernacular, and provide corrected spellings of those words (e.g., as part of a spell check or an autocorrect function). Thus, if a user enters the phrase "ex partr rexanimation," the device will offer the correct spelling of the misspelled words ("parte reexamination"), rather than offering no suggestions or only incorrect suggestions (e.g., "parts" and "reanimation").

Some implementations provide a method for providing a supplemental word correction dictionary. The method is performed at one or more electronic devices each having one or more processors and memory storing one or more programs for execution by the one or more processors. The method includes receiving an at least partial word input by a user; determining that a use condition of the at least partial word is satisfied; and in response to determining that the use condition is satisfied, obtaining a supplemental word correction dictionary that includes words associated with a same subject matter as the at least partial word, wherein the supplemental word correction dictionary supplements an existing word correction dictionary. In some implementations, the at least partial word is included in a plurality of words input by a user. In some implementations, the supplemental word correction dictionary is selected from a plurality of supplemental word correction dictionaries, each associated with a respective subject matter.

In some implementations, the method is performed at a server system, and obtaining the supplemental word correction dictionary includes retrieving the supplemental word correction dictionary from a storage device associated with the server system. In some implementations, the method further includes sending the supplemental word correction dictionary to a client device remote from the server system.

In some implementations, the method is performed at a client device, and obtaining the supplemental word correction dictionary includes sending a request for the supplemental word correction dictionary to a server system remote from the client device; and receiving the supplemental word correction dictionary from the server system. In some implementations, the method further includes replacing a plurality of characters received at the client device with a word from the supplemental word correction dictionary.

In some implementations, determining that the use condition is satisfied includes determining that the at least partial word is not found in the existing word correction dictionary. In some implementations, determining that the use condition is satisfied further includes determining that the at least partial word is found in the supplemental dictionary.

In some implementations, determining that the use condition is satisfied includes determining that the at least partial word has been input by the user a predetermined number of times. In some implementations, determining that the use condition is satisfied further includes determining that the at least partial word has been input by the user the predetermined number of times within a predetermined time period.

In some implementations, where the at least partial word is included in a plurality of words input by the user, determining that the use condition is satisfied includes determining that the plurality of words includes a predetermined number of words associated with the subject matter.

In some implementations, determining that the use condition is satisfied includes determining that words associated with the subject matter have been input by the user with a predetermined frequency.

In some implementations, where the at least partial word is included in a plurality of words input by the user, determining that the use condition is satisfied includes determining that at least one of the plurality of words is found in a list of trigger words. In some implementations, the list of trigger words is stored on the client device. In some implementations, the list of trigger words associates trigger words with an identifier of the supplemental word correction dictionary. In some implementations, the method further includes sending the identifier of the supplemental word correction dictionary from the client device to a server system; and receiving the supplemental word correction dictionary from the server system.

In some implementations, the at least partial word is input into any of the group consisting of: an email; a text message; a text document; a calendar entry; and a social networking post.

In some implementations, the method further includes, prior to obtaining the supplemental word correction dictionary, requesting user confirmation that the supplemental word correction dictionary should be obtained, wherein the supplemental word correction dictionary is obtained in response to receiving confirmation from the user.

In accordance with some implementations, an electronic device includes an input receiving unit configured to receive an at least partial word from a user. The electronic device also includes a processing unit coupled to the input receiving unit. The processing unit is configured to determine that a use condition of the at least partial word is satisfied; and in response to determining that the use condition is satisfied, obtain a supplemental word correction dictionary that includes words associated with a same subject matter as the at least partial word, wherein the supplemental word correction dictionary supplements an existing word correction dictionary.

In accordance with some implementations, an electronic device includes one or more processors, memory, and one or more programs; the one or more programs are stored in the memory and configured to be executed by the one or more processors and the one or more programs include instructions for performing the operations of any of the methods and/or techniques described herein. In accordance with some implementations, a computer readable storage medium has stored therein instructions, which, when executed by an electronic device, cause the device to perform the operations of any of the methods and/or techniques described herein. In accordance with some implementations, an electronic device includes means for performing the operations of any of the methods and/or techniques described herein. In accordance with some implementations, an information processing apparatus, for use in an electronic device includes means for performing the operations of any of the methods and/or techniques described herein.

BRIEF DESCRIPTION OF THE DRAWINGS

Like reference numerals refer to corresponding parts throughout the drawings.

DESCRIPTION OF IMPLEMENTATIONS

Figure 1:
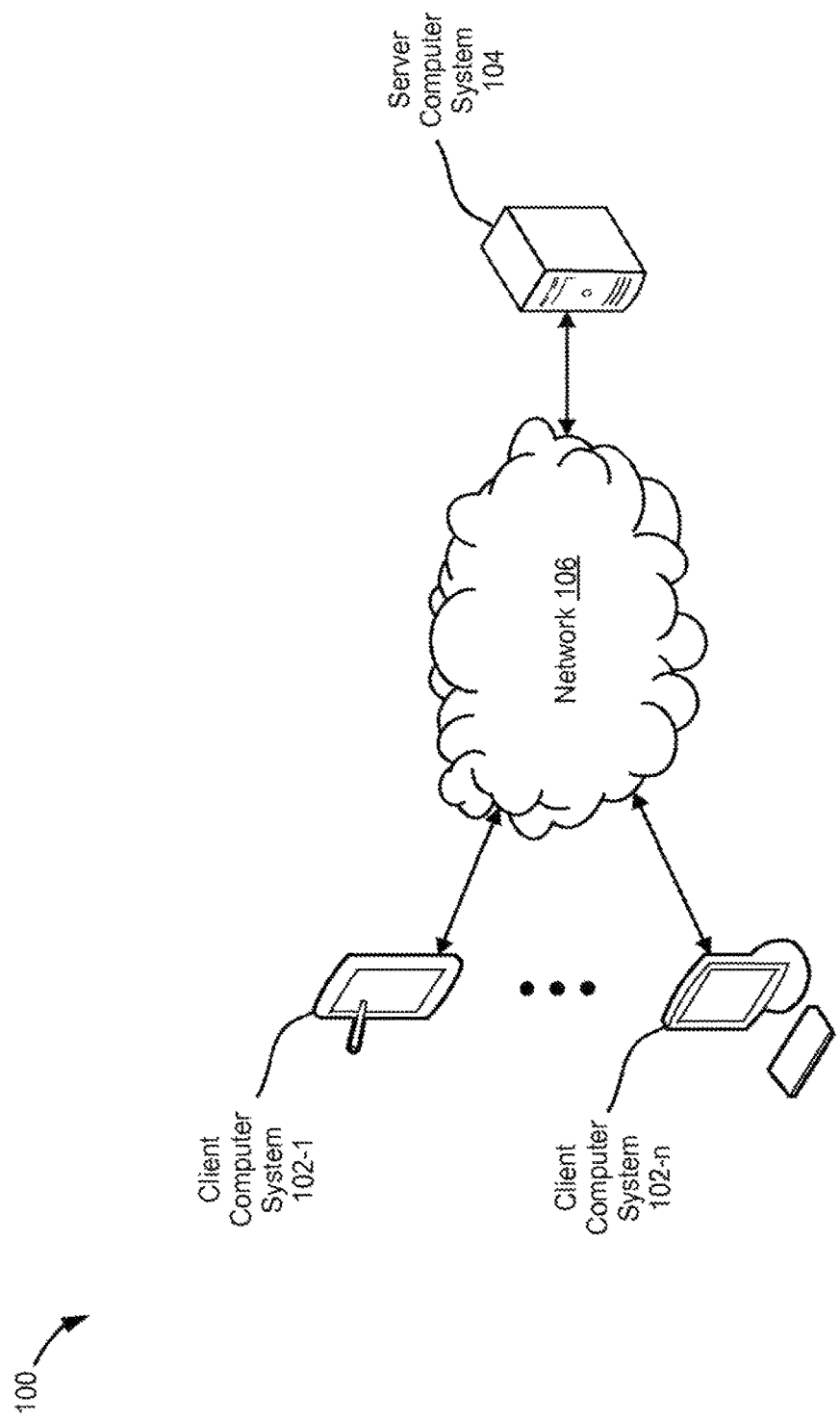
FIG. 1 is a block diagram illustrating a computer environment in which a method for automatically supplementing word correction dictionaries may be implemented, in accordance with some implementations

FIG. 1 illustrates a computer environment 100 in which a method for automatically supplementing word correction dictionaries may be implemented. The computer environment 100 includes client computer system(s) 102-1-102-*n* (sometimes referred to as client computers or client devices), and a server computer system 104 (sometimes referred to as a server computer), connected via a network 106 (e.g., the Internet). Client computer systems 102-*n* include, but are not limited to, laptop computers, desktop computers, tablet computers, handheld and/or portable computers, PDAs, cellular phones, smartphones, video game systems, digital audio players, remote controls, watches, televisions, and the like.

Figure 2:
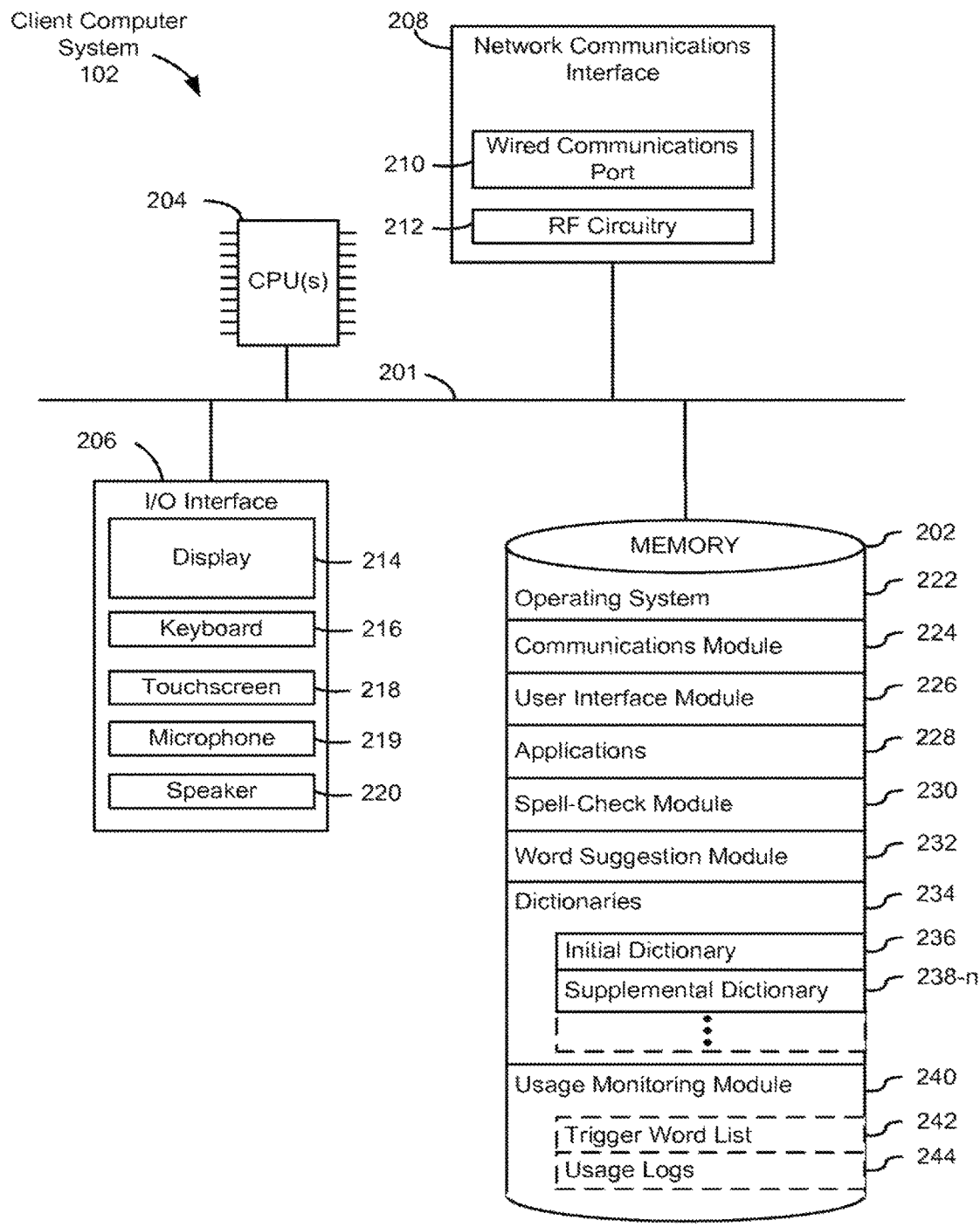
FIG. 2 is a block diagram illustrating a computer system, in accordance with some implementations.
Figure 3:
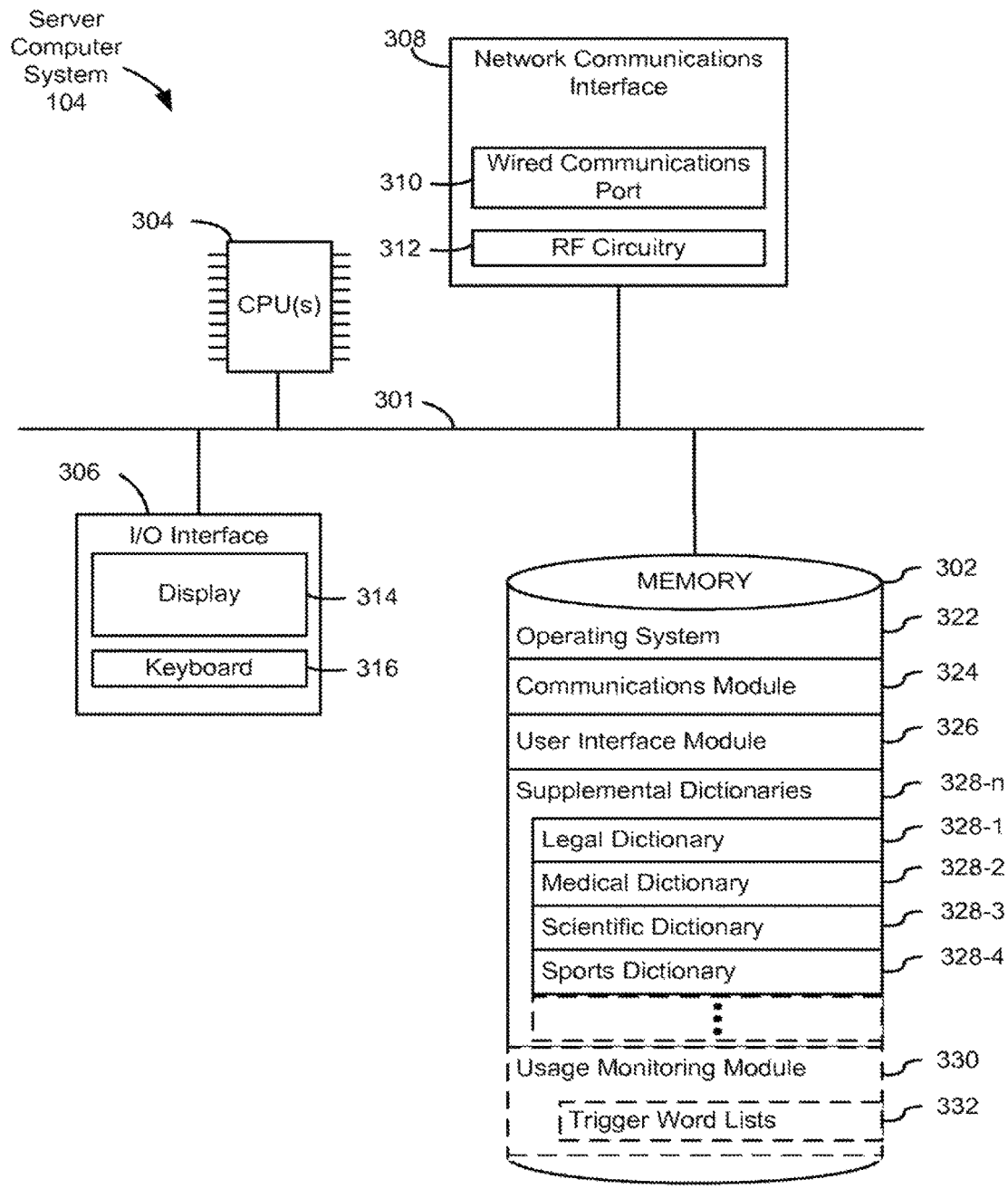
FIG. 3 is a block diagram illustrating another computer system, in accordance with some implementations.

As described in more detail with respect to FIGS. 2-3, the client computers 102-*n* and/or the server computer 104 provide hardware, programs, and/or modules to enable automatic supplementation of word correction dictionaries. For example, in some implementations, a user enters words into a client computer 102 during normal use, such as when composing emails, text messages, documents, and the like, and the client computer 102 and/or the server computer 104 determine that one or more supplemental dictionaries should be added to the client computer 102. Various ways of determining whether to provide supplemental dictionaries (and which supplemental dictionaries) are discussed herein.

FIG. 2 is a block diagram depicting a client computer system 102 in accordance with some implementations. In some implementations, the client computer system 102 is a laptop or desktop computer, tablet computer, smart phone, or the like. In some implementations, the components described as being part of the client computer system 102 are distributed across multiple client computers, server computers (e.g., the server computer 104), or any combination of client and server computers.

Moreover, the client computer system 102 is only one example of a suitable computer system, and some implementations have fewer or more components, combine two or more components, or have a different configuration or arrangement of the components than those shown in FIG. 2. The various components shown in FIG. 2 may be implemented in hardware, software, or a combination of hardware and software, including one or more signal processing and/or application specific integrated circuits.

Returning to FIG. 2, in some implementations, the client computer 102 includes memory 202 (which may include one or more computer readable storage mediums), one or more processing units (CPUs) 204, an input/output (I/O) interface 206, and a network communications interface 208. These components may communicate over one or more communication buses or signal lines 201. Communication buses or signal lines 201 may include circuitry (sometimes called a chipset) that interconnects and controls communications between system components.

The network communications interface 208 includes wired communications port 210 and/or RF (radio frequency) circuitry 212. Network communications interface 208 (in some implementations, in conjunction with wired communications port 210 and/or RF circuitry 212) enables communication with networks, such as the Internet, also referred to as the World Wide Web (WWW), an intranet and/or a wireless network, such as a cellular telephone network, a wireless local area network (LAN) and/or a metropolitan area network (MAN), and other devices. In some implementations, the network communications interface 208 facilitates communications between computer systems, such as between client and server computers. Wired communications port 210 receives and sends communication signals via one or more wired interfaces. Wired communications port 210 (e.g., Ethernet, Universal Serial Bus (USB), FIREWIRE, etc.) is adapted for coupling directly to other devices or indirectly over a network (e.g., the Internet, wireless LAN, etc.). In some implementations, wired communications port 210 is a multi-pin connector (e.g., Applicant's "LIGHTNING" connector) that is the same as, or similar to and/or compatible with the connector used on Applicant's IPHONE®, IPOD TOUCH®, and IPAD® devices. In some implementations, the wired communications port is a modular port, such as an RJ type receptacle.

The radio Frequency (RF) circuitry 212 receives and sends RF signals, also called electromagnetic signals. RF circuitry 212 converts electrical signals to/from electromagnetic signals and communicates with communications networks and other communications devices via the electromagnetic signals. RF circuitry 212 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol.

The I/O interface 206 couples input/output devices of the client computer 102, such as a display 214, a keyboard 216, a touch screen 218, a microphone 219, and a speaker 220 to the user interface module 226. The I/O interface 206 may also include other input/output components, such as physical buttons (e.g., push buttons, rocker buttons, etc.), dials, slider switches, joysticks, click wheels, and so forth.

The display 214 displays visual output to the user. The visual output may include graphics, text, icons, video, and any combination thereof (collectively termed "graphics"). In some implementations, some or all of the visual output corresponds to user-interface objects. For example, in some implementations, the visual output corresponds to text input fields and any other associated graphics and/or text (e.g., for receiving and displaying natural language text inputs). In some implementations, the display 214 uses LCD (liquid crystal display) technology, LPD (light emitting polymer display) technology, LED (light emitting diode) technology, OLED technology, or any other suitable technology or output device.

The keyboard 216 allows a user to interact with the client computer 102 by inputting characters and controlling operational aspects of the client computer 102. In some implementations, the keyboard 216 is a physical keyboard with a fixed key set. In some implementations, the keyboard 216 is a touchscreen-based, or "virtual" keyboard, such that different key sets (corresponding to different alphabets, character layouts, etc.) may be displayed on the display 214, and input corresponding to selection of individual keys may be sensed by the touchscreen 218.

The touchscreen 218 has a touch-sensitive surface, sensor or set of sensors that accepts input from the user based on haptic and/or tactile contact. The touchscreen 218 (along with any associated modules and/or sets of instructions in memory 202) detects contact (and any movement or breaking of the contact) on the touchscreen 218 and converts the detected contact into interaction with user-interface objects (e.g., one or more soft keys, icons, web pages or images) that are displayed on the display 214.

The touchscreen 218 detects contact and any movement or breaking thereof using any of a plurality of suitable touch sensing technologies, including but not limited to capacitive, resistive, infrared, and surface acoustic wave technologies, as well as other proximity sensor arrays or other elements for determining one or more points of contact with the touchscreen 218. In an exemplary implementation, projected mutual capacitance sensing technology is used, such as that found in Applicant's IPHONE®, IPOD TOUCH®, and IPAD® devices.

Memory 202 may include high-speed random access memory and may also include non-volatile and/or non-transitory computer readable storage media, such as one or more magnetic disk storage devices, flash memory devices, or other non-volatile solid-state memory devices. In some implementations, memory 202, or the non-volatile and/or non-transitory computer readable storage media of memory 202, stores the following programs, modules, and data structures, or a subset thereof: operating system 222, communications module 224, user interface module 226, applications 228, spell-check module 230, word suggestion module 232, dictionaries 234, and usage monitoring module 240.

The operating system 222 (e.g., DARWIN, RTXC, LINUX, UNIX, IOS, OS X, WINDOWS, or an embedded operating system such as VXWORKS) includes various software components and/or drivers for controlling and managing general system tasks (e.g., memory management, storage device control, power management, etc.) and facilitates communication between various hardware and software components.

The communications module 224 facilitates communication with other devices over the network communications interface 208 and also includes various software components for handling data received by the RF circuitry 212 and/or the wired communications port 210.

The user interface module 226 receives commands and/or inputs from a user via the I/O interface (e.g., from the keyboard 216 and/or the touchscreen 218), and generates user interface objects on the display 214. In some implementations, the user interface module 226 provides virtual keyboards for entering text via the touchscreen 218.

Applications 228 may include programs and/or modules that are configured to be executed by the client computer 102. In some implementations, the applications include the following modules (or sets of instructions), or a subset or superset thereof:
  contacts module (sometimes called an address book or contact list);
  telephone module;
  video conferencing module;
  e-mail client module;
  instant messaging (IM) module;
  text messaging module;
  workout support module;
  camera module for still and/or video images;
  image management module;
  browser module;
  calendar module;
  widget modules, which may include one or more of: weather widget, stocks widget, calculator widget, alarm clock widget, dictionary widget, and other widgets obtained by the user, as well as user-created widgets;
  widget creator module for making user-created widgets;
  search module;
  media player module, which may be made up of a video player module and a music player module;
  notes module;
  map module; and/or
  online video module.

Examples of other applications 228 that may be stored in memory 202 include word processing applications, image editing applications, drawing applications, presentation applications, JAVA-enabled applications, encryption, digital rights management, voice recognition, and voice replication applications. In some implementations, these applications (and/or other applications not listed) work together with the spell-check module 230 and the word suggestion module 232 (described below) to provide spell check and/or word selection functions for text that is input into the applications.

The spell-check module 230 determines whether words that are input by the user are correctly spelled. In some implementations, the spell-check module 230 compares each word entered by the user against the words in the dictionaries 234 to determine whether a match exists. If no match exists for a respective word, the user is alerted that the word may be misspelled. For example, the word may be highlighted (e.g., in yellow), underlined, or otherwise displayed in a distinctive manner. In some implementations, if no match exists, the user is alerted during a spell-check operation, where the user is sequentially alerted to all of the misspelled words in a document or text input. In some implementations, the spell-check module 230 operates in conjunction with the word suggestion module 232 to provide alternative spellings for a misspelled word. In some implementations, the spell-check module 230 and the word suggestion module 232 operate in conjunction with the user interface module 226 to display misspelled words in a distinctive manner and to provide user interface objects for word suggestions (e.g., lists of suggested words, additional letters following those that are already entered, etc.). For example, in some implementations, the spell-check module 230 identifies, to the user interface module 226, which words are misspelled, and the user interface module 226 causes those words to be displayed in a distinctive manner (e.g., with a red underline). When the word is selected (e.g., by a finger press or mouse click), the user interface module 226 causes a list of selectable alternative spellings provided by the word suggestion module 232 to be displayed to the user (e.g., in a drop down menu or popup window).

The word suggestion module 232 determines alternative spellings (e.g., words that the user likely intended to enter) for user-entered words or text sequences that do not appear in the dictionaries 234. For example, in some implementations, when the spell-check module 230 determines that a user-entered word does not appear in the dictionaries 234, the word suggestion module 232 identifies one or more words from the dictionaries 234 that are similar to the misspelled word. Various techniques may be used to determine what words are similar to a misspelled word, such as approximate string matching (e.g., using Damerau-Levenshtein distance to determine the similarity between the misspelled word and candidate word suggestions), n-gram analysis, and the like. In some implementations, one or more candidate word suggestions are presented to the user as possible replacements for a misspelled word (e.g., in a drop down menu or popup window and/or as part of a spell-check operation, as discussed above). In some implementations, the word suggestion module provides an autocorrect function, where misspelled words are automatically replaced (as soon as they are input) with other words if it is determined that the other words were actually intended by the user. For example, this may occur when the word suggestion module 232 identifies only one candidate word for a misspelled word, or when one candidate word is substantially more similar to the misspelled word than any other candidate words, either of which indicates that the user most likely intended the candidate word.

The dictionaries 234 include an initial dictionary 236 and supplemental dictionaries 238-$n$. The dictionaries 234 include lists of words, and are accessible to and/or used by the spell-check module 230 and the word suggestion module 232 (and/or any other programs or modules of the client computer 102). In some implementations, the dictionaries 234 include additional information, such as pronunciation guides (human and/or machine readable), subject matter identifiers, definitions, part-of-speech information, common misspellings, usage statistics, etc. In some implementations, the supplemental dictionaries 238-*n* relate to particular subjects. For example, supplemental dictionaries may be dictionaries of words related to legal terms, medical terms, sports terms (including, for example, team names, player rosters, etc.), music terms (including, for example, band names, artist names, song/album names, etc.), scientific terms, computer terms, and the like. Of course, dictionaries for other subjects (and sub-categories and super-categories of the listed subjects) may be provided as well. For example, there may be numerous different supplemental dictionaries for sports terms, such as dictionaries for specific sports (e.g., including team names and player rosters for all professional and college football teams), dictionaries for sports associated with a particular region (e.g., including team names and player rosters for all California professional sports teams), etc. In some implementations, the supplemental dictionaries 238-*n* include words from different languages (e.g., Latin words may commonly appear in Medical and Legal supplemental dictionaries).

In some implementations, the supplemental dictionaries 238-*n* include dictionaries of foreign words. These may be particularly beneficial for users that input text into a device in several different languages, either as mixed text strings (e.g., "I'm all out of dinero!"), or separate text strings (e.g., a bi-lingual user may use different languages at different times). In some implementations, supplemental word correction dictionaries that include foreign words are full spell-check dictionaries (e.g., include all or substantially all of the words that would be in an initial dictionary for that language. In some implementations, they include a smaller subset of foreign words, such as those words from the foreign language that are most commonly used by non-native speakers of that language.

Figure 4A:
FIGS. 4A-4B illustrate exemplary data structures associated with providing a supplemental word correction dictionary, in accordance with some implementations.

The usage monitoring module 240 monitors text inputs for determining which (if any) supplemental dictionaries should be included in a client computer. In some implementations, the usage monitoring module 240 includes a trigger word list 242 and usage logs 244. The trigger word list (or lists) 242 includes words that are each associated with a subject for which a supplemental dictionary exists. An example of a trigger word list 242 is shown in FIG. 4A, in accordance with some implementations. As shown in FIG. 4A, individual words may be associated with one or more subjects. For example, "syzgzy" is associated with the broader "scientific" subject, as well as the narrower "astronomy" subject. In some implementations, the usage monitoring module 240 uses the trigger word list 242 to determine which supplemental dictionaries should be included on the client computer 102. For example, if a user enters a word that is found in the trigger words list 242, the supplemental dictionary associated with that word is downloaded to the client computer. Specific techniques for determining which dictionaries to include are discussed below with reference to FIGS. 5A-5B.

In some implementations, the usage logs 244 include a list of out-of-dictionary words that were entered by a user and were not corrected. For example, if a user enters the word "syzgzy" into a note taking application, and it is identified as misspelled but is not corrected by the user, that word may be included in a usage log 244. In some implementations, usage logs include a listing of all of the words entered by a user. In some implementations, usage logs exclude common words, such as "the," "and," "be," and the like. In some implementations, the usage monitoring module 240 uses the usage logs 244 to determine which supplemental dictionaries should be included on the client computer.

Figure 4B:

In some implementations, the usage logs 244 also include usage statistics for the words, such as the number of times that a word has been used, the frequency of its use, etc. FIG. 4B illustrates an example of a usage log 244 that includes a list of all words entered by a user, in accordance with some implementations. In this example, the usage log 244 includes a column identifying the number of times that each word has been input by the user (e.g., the "# of instances"). Various ways in which usage logs 244 may be used by the usage monitoring module 240 to determine what supplemental dictionaries should be included in the client computer are discussed below with reference to FIGS. 5A-5B.

In some implementations, usage logs are provided to a remote computer system (e.g., the server computer 104). The remote computer system then uses the usage logs to determine what supplemental dictionaries should be provided to the client computer. By providing usage logs to the remote computer system for analysis, a user's privacy can be maintained while also reducing the processing load on the client computer. In particular, because the usage log includes word lists that have been extracted from text inputs, but does not include the text inputs themselves, the contents of the user's communications and documents are not exposed. In some implementations, where analysis of usage logs occurs on a server or other computer remote from the client computer, users can disable the option of sending usage logs to the remote computer.

FIG. 3 is a block diagram depicting a server computer system 104 in accordance with some implementations. In some implementations, the components described as being part of the server computer system 104 are distributed across multiple server computers, client computers, or any combination of client and server computers.

Moreover, the server computer system 104 is only one example of a suitable computer system, and some implementations have fewer or more components, combine two or more components, or have a different configuration or arrangement of the components than those shown in FIG. 3. The various components shown in FIG. 3 may be implemented in hardware, software, or a combination of hardware and software, including one or more signal processing and/or application specific integrated circuits.

Returning to FIG. 3, in some implementations, the server computer 104 includes memory 302 (which may include one or more computer readable storage mediums), one or more processing units (CPUs) 304, an input/output (I/O) interface 306, and a network communications interface 308. These components may communicate over one or more communication buses or signal lines 301. Communication buses or signal lines 301 may include circuitry (sometimes called a chipset) that interconnects and controls communications between system components.

The network communications interface 308 includes wired communications port 310 and/or RF (radio frequency) circuitry 312. Network communications interface 308 (in some implementations, in conjunction with wired communications port 310 and/or RF circuitry 312) enables communication with networks, such as the Internet, also referred to as the World Wide Web (WWW), an intranet and/or a wireless network, such as a cellular telephone network, a wireless local area network (LAN) and/or a metropolitan area network (MAN), and other devices. In some implementations, the network communications interface 308 facilitates communications between computer systems, such as between client and server computers. Wired communications port 310 receives and sends communication signals via one or more wired interfaces. Wired communications port 310 (e.g., Ethernet, Universal Serial Bus (USB), FIREWIRE, etc.) is adapted for coupling directly to other devices or indirectly over a network (e.g., the Internet, wireless LAN, etc.). In some implementations, the wired communications port is a modular port, such as an RJ type receptacle.

The radio Frequency (RF) circuitry 312 receives and sends RF signals, also called electromagnetic signals. RF circuitry 312 converts electrical signals to/from electromagnetic signals and communicates with communications networks and other communications devices via the electromagnetic signals. RF circuitry 312 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol.

The I/O interface 306 couples input/output devices of the server computer 104, such as a display 314 and a keyboard 316 to the user interface module 326. The I/O interface 306 may also include other input/output components, such as physical buttons (e.g., push buttons, rocker buttons, etc.), dials, slider switches, joysticks, click wheels, and so forth.

The display 314 displays visual output to the user. The visual output may include graphics, text, icons, video, and any combination thereof (collectively termed "graphics"). In some implementations, the display 314 uses LCD (liquid crystal display) technology, LPD (light emitting polymer display) technology, LED (light emitting diode) technology, OLED technology, or any other suitable technology or output device.

The keyboard 316 allows a user to interact with the server computer 104 by inputting characters and controlling operational aspects of the server computer 104. In some implementations, the keyboard 316 is a physical keyboard with a fixed key set. In some implementations, the keyboard 316 is a touchscreen-based, or "virtual" keyboard, such that different key sets (corresponding to different alphabets, character layouts, etc.) may be displayed on the display 314, and input corresponding to selection of individual keys may be sensed by one or more touch-sensitive sensors and/or surfaces.

Memory 302 may include high-speed random access memory and may also include non-volatile and/or non-transitory computer readable storage media, such as one or more magnetic disk storage devices, flash memory devices, or other non-volatile solid-state memory devices. In some implementations, memory 302, or the non-volatile and/or non-transitory computer readable storage media of memory 302, stores the following programs, modules, and data structures, or a subset thereof: operating system 322, communications module 324, user interface module 326, supplemental dictionaries 328-*n*, and usage monitoring module 330.

The operating system 322 (e.g., DARWIN, RTXC, LINUX, UNIX, IOS, OS X, WINDOWS, or an embedded operating system such as VXWORKS) includes various software components and/or drivers for controlling and managing general system tasks (e.g., memory management, storage device control, power management, etc.) and facilitates communication between various hardware and software components.

The communications module 324 facilitates communication with other devices over the network communications interface 308 and also includes various software components for handling data received by the RF circuitry 312 and/or the wired communications port 310.

The user interface module 326 receives commands and/or inputs from a user via the I/O interface (e.g., from the keyboard 316 and/or the touchscreen 318), and generates user interface objects on the display 314. In some implementations, the user interface module 326 provides virtual keyboards for entering text via the touchscreen 318.

Supplemental dictionaries 328-*n* include the various supplemental dictionaries that can be provided to client computers to supplement an initial word correction dictionary on those devices (e.g., the initial dictionary 236, FIG. 2). In some implementations, the supplemental dictionaries 328-*n* include terms related to a particular subject matter. For example, as shown in FIG. 3, supplemental dictionaries 328 include a legal dictionary 328-1, a medical dictionary 328-2, a scientific dictionary 328-3, a sports dictionary 328-4, and so forth. Individual supplemental dictionaries are provided to a client device based on a request from the client device for that dictionary (e.g., because the client device determined that a use condition has been satisfied indicating a need for that dictionary), and/or because a server computer determined that the use condition has been met. Thus, in some implementations, the client computer 102 initiates the transfer of a supplemental dictionary from a server, and in some implementations, the server computer 104 initiates the transfer. In some implementations, both the server 104 and the client 102 are able to initiate the transfer of a supplemental dictionary.

In some implementations, the usage monitoring module 330 monitors word usage from one or more client computers, and determines which (if any) supplemental dictionaries 328 should be provided to the respective client computers. In some implementations, the usage monitoring module 330 receives usage logs from client computers (e.g., the usage logs 244, FIG. 2), and compares the words in the usage logs against the words in the supplemental dictionaries 328 to determine if certain use conditions are met (e.g., whether a user has input a predetermined number of words in a given supplemental dictionary). In some implementations, the usage monitoring module 330 includes a trigger word list 332, similar to the trigger word list 242 discussed above with respect to FIGS. 2 and 4A. Trigger word lists 332 include subsets of words from respective supplemental dictionaries. In some implementations, the usage monitoring module 330 uses the trigger word list 332 to determine which supplemental dictionaries should be included on the client computer. Specific techniques for determining which dictionaries to include are discussed below with reference to FIGS. 5A-5B.

In some implementations, comparing a user's word usage against all of the words in the supplemental dictionaries provides a robust analysis of what subjects the user is interested in (and hence what dictionaries would be useful to him or her), because any user-inputted word that appears in the supplemental dictionaries will be identified. On the other hand, comparing word usage against the trigger word list 332, which includes only a subset of the words in the supplemental dictionaries, may adequately identify dictionaries that will be useful to a user, while reducing processing time and memory usage.

Figure 5A:
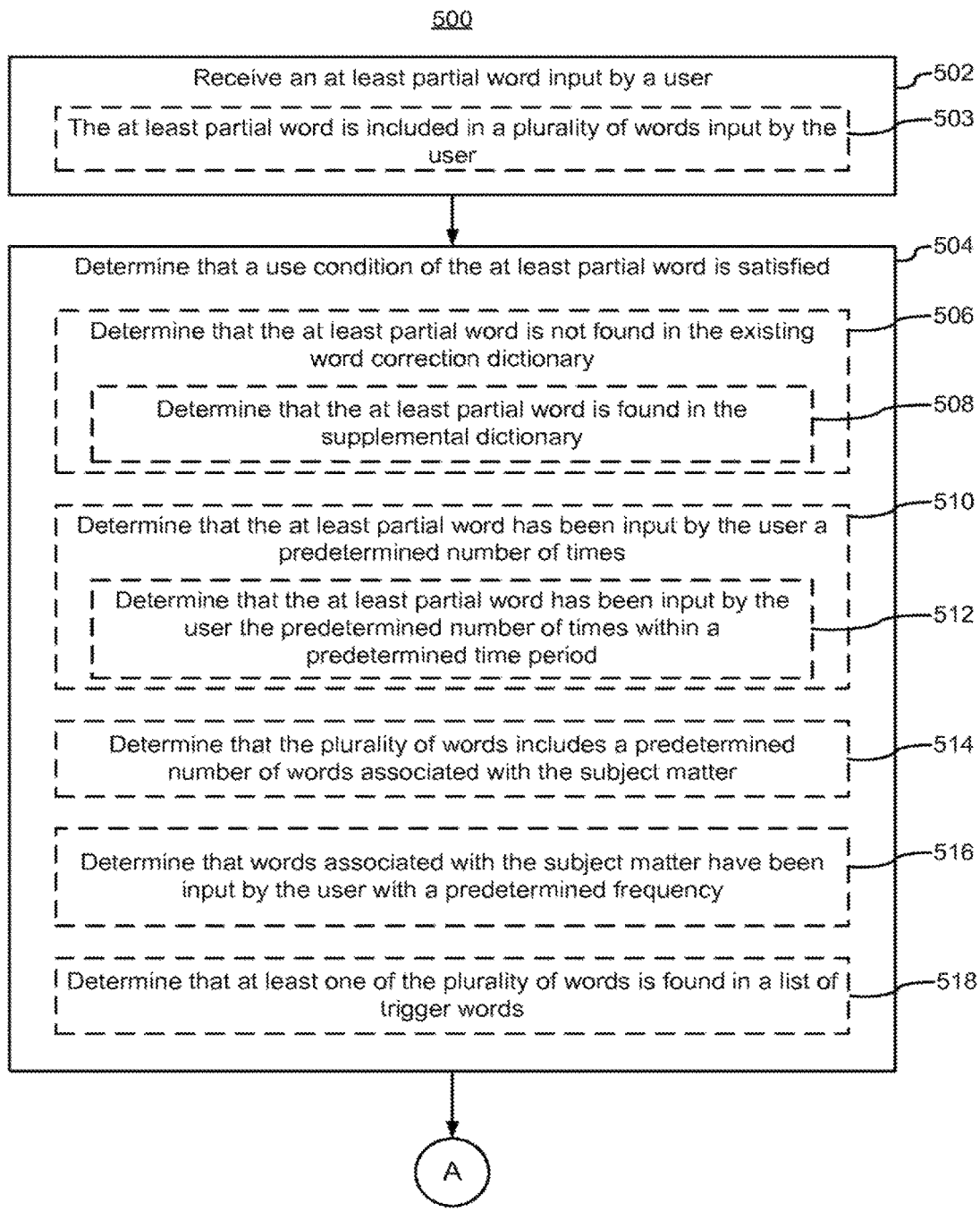
FIGS. 5A-5B are flow charts illustrating a method for providing a supplemental word correction dictionary, in accordance with some implementations.
Figure 5B:
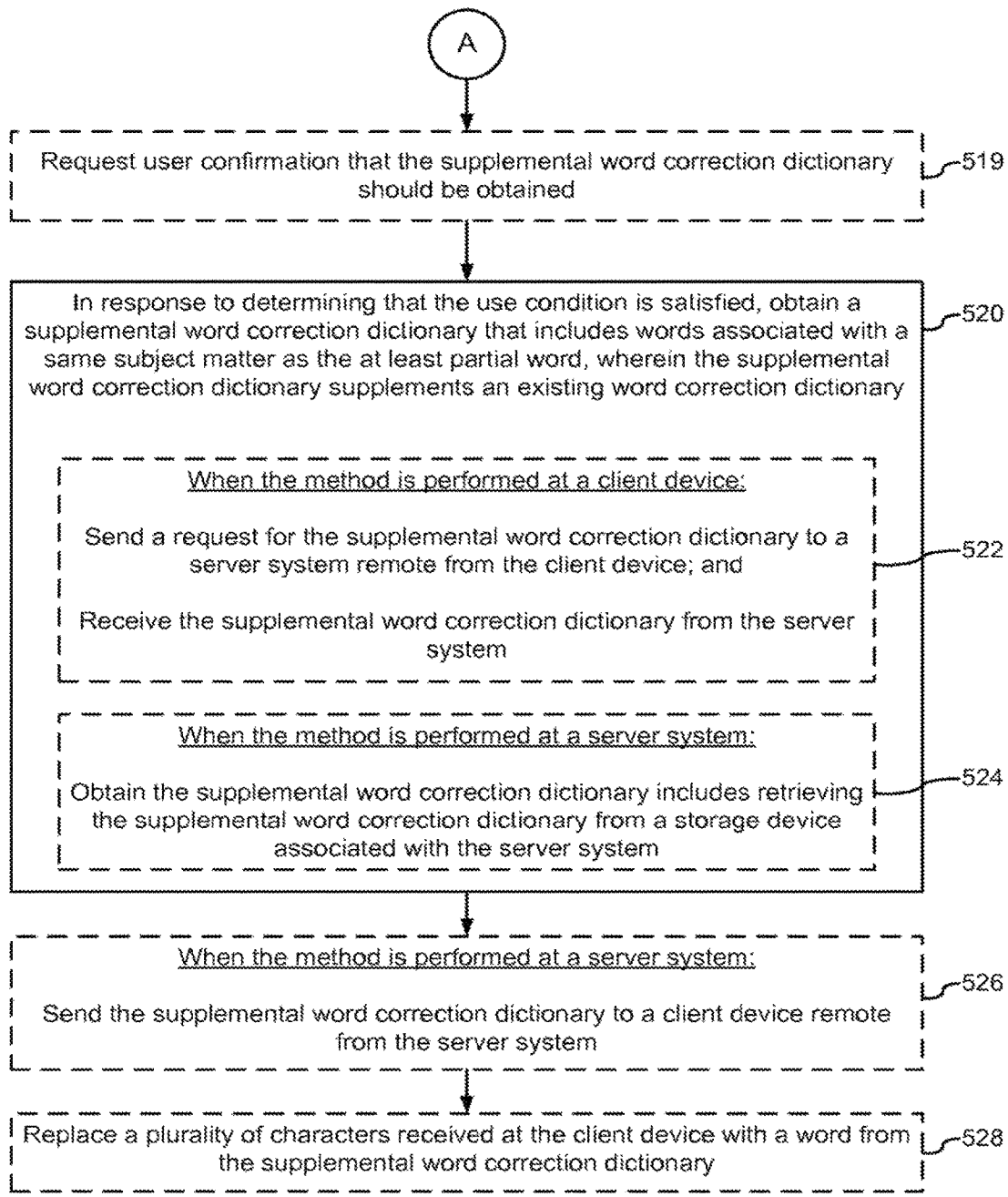

FIGS. 5A-5B are flow diagrams representing a method 500 for providing a supplemental word correction dictionary, according to certain implementations. The methods are, optionally, governed by instructions that are stored in a computer memory or non-transitory computer readable storage medium (e.g., memory 202 of the client computer 102, memory 302 of the server computer 104) and that are executed by one or more processors of one or more computer systems, including, but not limited to, the client computer system 102 and/or the server computer system 104. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various implementations, some operations in each method may be combined and/or the order of some operations may be changed from the order shown in the figures. Also, in some implementations, operations shown in separate figures and/or discussed in association with separate methods may be combined to form other methods, and operations shown in the same figure and/or discussed in association with the same method may be separated into different methods.

In some implementations, the method 500 is performed at one or more electronic devices each having one or more processors and memory storing one or more programs for execution by the one or more processors (e.g., the client computer 102 and/or the server computer 104). For simplicity, the following discussion describes several of the steps of the method 500 as being performed by a computer system, which includes, in some implementations, the client computer 102, the server computer 104, or both (and/or other computer systems as well).

Turning to FIG. 5A, the computer system receives an at least partial word input by a user (502). In some implementations, the at least partial word is included in a plurality of words input by the user (503). Words are input, for example, into a text entry field in an email, a text/instant message, a text document (e.g., a word processing document, a note taking application, etc.), a calendar entry, a social networking post, and the like. In some implementations, the words may be input into a text field via a speech-to-text function (e.g., a user can speak the words, and the speech-to-text function will provide textual representations of the words for input into the text field.) In some implementations where the computer system is a server computer system, the plurality of words are input into a client device, and are received by the server computer. In some implementations, the plurality of words are sent to the server computer in one or more usage logs 244 (FIGS. 2 and 4B).

The computer system determines that a use condition of at least one word of the plurality of words is satisfied (504).

In some implementations, determining that the use condition is satisfied (step 504) includes determining that the at least partial word is not found in the existing word correction dictionary (506). For example, a client device (e.g., the client computer 102) will determine as part of a spell-check operation (e.g., with the spell-check module 230) that the at least partial word that was input by a user does not appear in the initial dictionary 236. In some implementations, the computer system determines that the at least partial word is not found in the existing word correction dictionary, and is also not corrected by the user (since a user correcting a word indicates that it was misspelled, and not merely out-of-dictionary). Thus, for example, if a user enters the word "teh" but subsequently corrects it to "the," the computer system will not attempt to obtain a supplemental dictionary based on the word "teh," even though it did not appear in the existing dictionary. In some implementations, if a word is not found in the existing dictionary, but corresponds to a common misspelling of another word (e.g., "teh" for "the"), the use condition will not be satisfied with respect to that word.

In some implementations, the electronic device determines whether the use condition is satisfied for a partial word, instead of a complete word, such as by determining that a partial word most likely corresponds to a particular word, and then determining whether a use condition is satisfied for that particular word. For example, if a user enters the partial word "szyg," the electronic device can determine that the most likely (or possibly the only) word that starts with these letters is "szygzy," and determine whether the use condition for the complete word is satisfied.

In some implementations, determining that the use condition is satisfied (step 504) further includes determining that the at least partial word is found in the supplemental dictionary (508). Thus, if a word is not found in an existing dictionary, but it is found in a supplemental dictionary, then the use condition is satisfied, and the supplemental dictionary will be obtained. If the word is not found in either the existing or the supplemental dictionaries, the use condition is not satisfied, and no supplemental dictionary will be obtained. In some implementations, such as where the method takes place on a client computer, step (508) includes sending the at least one word to a remote computer (e.g., the server system 104) so that the remote computer can search among stored supplemental dictionaries (e.g., supplemental dictionaries 328) for the at least partial word. In some implementations, the at least partial word is sent to the remote computer in one or more usage logs (e.g., usage log 244, FIGS. 2 and 4B).

In some implementations, determining that the use condition is satisfied (step 504) includes determining that the at least partial word has been input by the user a predetermined number of times (510). For example, in some implementations, if a word that does not appear in an existing dictionary (but that does appear in a supplemental dictionary) has been input by a user twice, then a supplemental dictionary in which that word appears is obtained. In some implementations, the predetermined number of times is 2, 3, 4, or 5, or any other appropriate number. In some implementations, if the word does not appear in any supplemental dictionary, then the use condition is not satisfied and no supplemental dictionary is obtained, regardless of how many times the word has been entered.

In some implementations, determining that the use condition is satisfied (step 504) further includes determining that the at least partial word has been input by the user the predetermined number of times within a predetermined time period (512). For example, in some implementations, the use condition is satisfied if the word is input twice in a single day. Other usage frequencies are used in various implementations, such as if the word is used five times per day, once per week, etc.

In some implementations, determining that the use condition is satisfied (step 504) includes determining that the plurality of words includes a predetermined number of words associated with the subject matter (514). Thus, it can be determined whether a user is using enough different words of a particular subject matter to justify obtaining the supplemental dictionary for that subject matter. Additionally, it can be inferred that a user would benefit from that supplemental dictionary without relying on the user entering just a single word a predetermined number of times and/or with a predetermined frequency. In some implementations, the use condition is satisfied if 2, 5, 10, or more user-entered words are found in a supplemental dictionary for a particular subject matter. As a specific example, in some implementations, if a user enters any two words (e.g., "Favre" and "Pujols") that are found in a particular supplemental dictionary (e.g., including "Sports" terms), then that supplemental dictionary is obtained. In some implementations, the use condition is satisfied if a predetermined number of words associated with the subject matter are input into a single text input field (e.g., an email body, a text/instant message, a text document, etc.).

In some implementations, determining that the use condition is satisfied (step 504) includes determining that words associated with the subject matter have been input by the user with a predetermined frequency (516). Thus, if a user inputs words that appear in a "medical" supplemental dictionary (even if they are different words) with a predetermined frequency (e.g., 1 word per day, 5 words per day, 50 words per week, etc.), the use condition is satisfied.

In some implementations, determining that the use condition is satisfied (step 504) includes determining that at least one of the plurality of words is found in a list of trigger words (518). In some implementations, the computer system stores one or more lists of trigger words (e.g., the trigger word list 242, FIGS. 2 and 4A), and if the user enters a word that appears on the trigger word list, a supplemental dictionary of the same subject matter of that word is obtained. For example, if a user entered the word "reexamination," which is listed as a "legal" word on the trigger word list 242 (FIG. 4A), a supplemental dictionary for "legal" terms will be obtained. In some implementations, the list of trigger words is stored on a client device (e.g., the client device 102), and the client device determines whether the at least one of the plurality of words appear in the list of trigger words (e.g., with the usage monitoring module 240). In some implementations, if the client device determines that a trigger word associated with a particular word correction dictionary has been used, it sends an identifier of the supplemental word correction dictionary to a server system (e.g., the server system 104), and receives the supplemental word correction dictionary from the server system, as discussed below with reference to step (522). In some implementations, the client device only requests the supplemental dictionary from the server system when the client device is coupled to a high-speed network and/or a network that is not associated with a data-limited service (e.g., a Wi-Fi rather than a cellular data network).

In some implementations, any of the use conditions described above are used in conjunction with the trigger word list. For example, in some implementations, the use condition is satisfied when a user inputs a word that appears on a trigger word list a predetermined number of times and/or with a predetermined frequency. In some implementations, the use condition is satisfied when a user inputs a plurality of words that both appear on a trigger word list and are associated with a particular subject matter a particular number of times and/or with a predetermined frequency. For example, the use condition may be satisfied if a user inputs 5 "sports" words that are each contained in the trigger word list 242. On the other hand, in some implementations, the user conditions are used in conjunction with entire dictionaries, such as when usage logs are sent to a remote server, and the remote server determines if the use conditions are satisfied with respect to any word found in any of the supplemental dictionaries.

Turning to FIG. 5B, in some implementations, the computer system requests user confirmation that the supplemental word correction dictionary should be obtained (519). For example, the computer system will cause a prompt to be presented to the user that identifies the particular supplemental dictionary that is to be obtained and allows the user to accept or reject the dictionary. Specifically, a prompt may include the text "It looks like you use quite a few [subject matter] words. Would you like to download a dictionary that will help make sure these words are correctly spelled?" In some implementations, the prompt is displayed graphically. In some implementations, the prompt is spoken to the user, such as by a digital assistant (e.g., Applicants' SIRI®). If the user accepts the dictionary (e.g., by pressing an "accept" button, speaking words of assent, or any other appropriate way), the dictionary will be obtained. If the user rejects the dictionary, it will not be obtained. This way, if a word was simply mistyped, represents an isolated usage by the user, or is associated with several different (and potentially unrelated) subjects, an unnecessary supplemental dictionary will not be obtained.

In response to determining that the use condition is satisfied (and, in some implementations, determining that the user has confirmed that the dictionary should be obtained), the computer system obtains a supplemental word correction dictionary that includes words associated with a same subject matter as the at least partial word, wherein the supplemental word correction dictionary supplements an existing word correction dictionary (520). Thus, as a specific example, if a use condition is satisfied for the word "szygzy" (e.g., it is not found in an existing word correction dictionary on a client device), the computer system obtains a supplemental word correction dictionary that includes other words associated with the subject matter of "science" or "astronomy."

In some implementations where parts of the method 500 are performed at a client device (e.g. the client computer 102), obtaining the supplemental word correction dictionary includes sending a request for the supplemental word correction dictionary to a server system remote from the client device, and receiving the supplemental word correction dictionary from the server system (522). In some implementations, the request includes an identifier of a particular supplemental dictionary (e.g., "sports," "legal," etc.).

In some implementations where parts of the method 500 are performed at a server system (e.g., the server system 104), obtaining the supplemental word correction dictionary includes retrieving the supplemental word correction dictionary from a storage device associated with the server system (524). In some implementations, the method then further includes sending the supplemental word correction dictionary to a client device (e.g., the client computer 102) remote from the server system (526).

In some implementations, the computer system replaces a plurality of characters received at the client device with a word from the supplemental word correction dictionary (528). For example, once the client device 102 receives and stores a supplemental word correction dictionary, the client device 102 replaces a plurality of user-entered characters (e.g., a misspelled word) with a word from the supplemental dictionary (e.g., as part of a spell-check operation). In another example, the client device 102 replaces one or more user-entered characters with a selected candidate word from the supplemental dictionary, such as when an auto-suggest and/or auto-complete function provides one or more candidate complete words based on one or more initial letters (e.g., suggesting "reexamination" when the user enters "reex").

Figure 6:
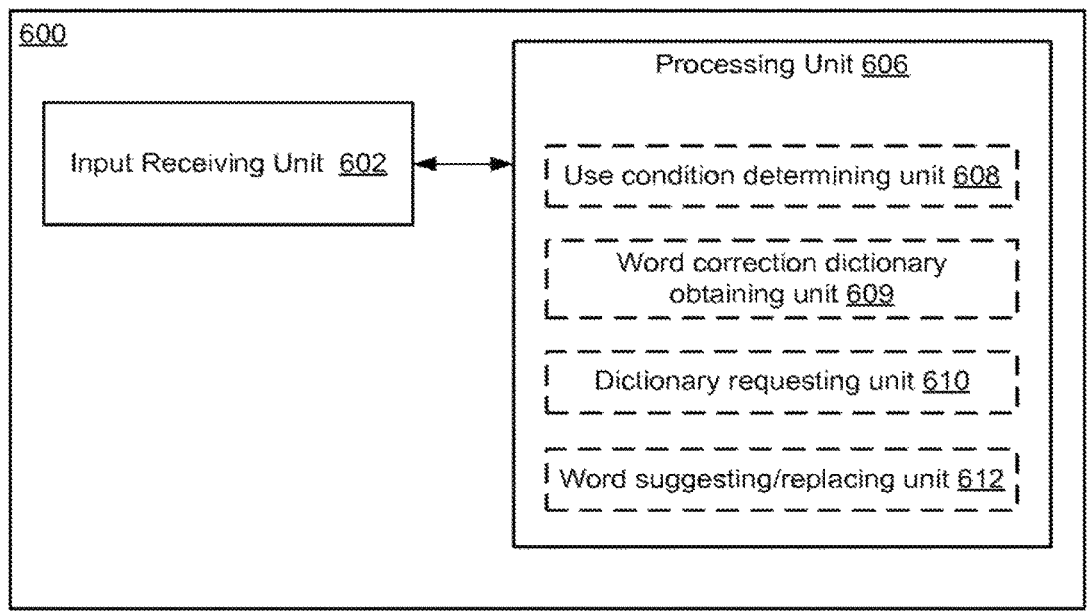
FIG. 6 is a functional block diagram of an electronic device in accordance with some implementations.

In accordance with some implementations, FIG. 6 shows a functional block diagram of electronic device 600 configured in accordance with the principles of the invention as described above. The functional blocks of the device may be implemented by hardware, software, or a combination of hardware and software to carry out the principles of the invention. It is understood by persons of skill in the art that the functional blocks described in FIG. 6 may be combined or separated into sub-blocks to implement the principles of the invention as described above. Therefore, the description herein may support any possible combination or separation or further definition of the functional blocks described herein.

As shown in FIG. 6, electronic device 600 includes an input receiving unit 602 configured to receive an at least partial word from a user. In some implementations, the at least partial word is input into any of the group consisting of: an email; a text message; a text document; a calendar entry; and a social networking post. The electronic device 600 also includes processing unit 606 coupled to the input receiving unit 602. In some implementations, processing unit 606 includes a use condition determining unit 608, a word correction dictionary obtaining unit 609, a dictionary requesting unit 610, and a word suggesting/replacing unit 612.

The processing unit 606 is configured to determine that a use condition of the at least partial word is satisfied (e.g., with the use condition determining unit 608); and in response to determining that the use condition is satisfied, obtain a supplemental word correction dictionary that includes words associated with a same subject matter as the at least partial word (e.g., with the word correction dictionary obtaining unit 609), wherein the supplemental word correction dictionary supplements an existing word correction dictionary.

In some implementations, the at least partial word is included in a plurality of words input by a user. In some implementations, the supplemental word correction dictionary is selected from a plurality of supplemental word correction dictionaries, each associated with a respective subject matter.

In some implementations, the electronic device 600 obtains the supplemental word correction dictionary by sending a request for the supplemental word correction dictionary to a server system remote from the electronic device 600 device (e.g., with the dictionary requesting unit 610); and receives the supplemental word correction dictionary from the server system (e.g., with the word correction dictionary obtaining unit 609).

In some implementations, the electronic device 600 is further configured to replace a plurality of characters received at the electronic device with a word from the supplemental word correction dictionary (e.g., with the word suggesting/replacing unit 612).

In some implementations, determining that the use condition is satisfied (e.g., with the use condition determining unit 608) includes determining that the at least partial word is not found in the existing word correction dictionary. In some implementations, determining that the use condition is satisfied (e.g., with the use condition determining unit 608) further includes determining that the at least partial word is found in the supplemental dictionary.

In some implementations, determining that the use condition is satisfied (e.g., with the use condition determining unit 608) includes determining that the at least partial word has been input by the user a predetermined number of times. In some implementations, determining that the use condition is satisfied (e.g., with the use condition determining unit 608) further includes determining that the at least partial word has been input by the user the predetermined number of times within a predetermined time period.

In some implementations, determining that the use condition is satisfied (e.g., with the use condition determining unit 608) includes determining that the plurality of words includes a predetermined number of words associated with the subject matter.

In some implementations, determining that the use condition is satisfied (e.g., with the use condition determining unit 608) includes determining that words associated with the subject matter have been input by the user with a predetermined frequency.

In some implementations, determining that the use condition is satisfied (e.g., with the use condition determining unit 608) includes determining that at least one of the plurality of words is found in a list of trigger words. In some implementations, the list of trigger words is stored on the electronic device. In some embodiments, the list of trigger words associates trigger words with an identifier of the supplemental word correction dictionary.

In some implementations, the electronic device 600 sends the identifier of the supplemental word correction dictionary from the electronic device to a server system (e.g., with the dictionary requesting unit 612); and receives the supplemental word correction dictionary from the server system (e.g., with the word correction dictionary obtaining unit 609).

The foregoing description, for purpose of explanation, has been described with reference to specific implementations. However, the illustrative discussions above are not intended to be exhaustive or to limit the disclosed implementations to the precise forms disclosed. Many modifications and variations are possible in view of the above teachings. The implementations were chosen and described in order to best explain the principles and practical applications of the disclosed ideas, to thereby enable others skilled in the art to best utilize them with various modifications as are suited to the particular use contemplated.

It will be understood that, although the terms "first," "second," etc. may be used herein to describe various elements, these elements should not be limited by these terms. These terms are only used to distinguish one element from another.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method for providing a supplemental word correction dictionary, comprising:
   at one or more electronic devices each having one or more processors and memory storing one or more programs for execution by the one or more processors:
   receiving an at least partial word input by a user; determining whether a use condition of the at least partial word is satisfied, the use condition including a condition that the at least partial word is not found in an existing word correction dictionary of a local device; and
   in response to determining that the use condition is satisfied:
   determining whether the at least partial word is corrected by the user;
   in accordance with the determination that the at least partial word is not corrected by the user:
   obtaining a supplemental word correction dictionary from a remote source, the supplemental word correction dictionary consisting of words associated with a same subject matter as the at least partial word; and combining the supplemental word correction dictionary with the existing word correction dictionary;
   and in accordance with the determination that the at least partial word is corrected by the user, forgoing obtaining the supplemental word correction dictionary.

2. The method of claim 1, wherein the at least partial word is included in a plurality of words input by a user.

3. The method of claim 2, wherein determining that the use condition is satisfied includes determining that at least one of the plurality of words is found in a list of trigger words.

4. The method of claim 1, wherein the supplemental word correction dictionary is selected from a plurality of supplemental word correction dictionaries of the remote source, the plurality of supplemental word correction dictionaries each associated with a respective subject matter.

5. The method of claim 1, wherein obtaining the supplemental word correction dictionary from the remote source includes retrieving the supplemental word correction dictionary from a storage device associated with a server system.

6. The method of claim 1, wherein the method is performed at a client device, and wherein obtaining the supplemental word correction dictionary from the remote source includes:
   sending a request for the supplemental word correction dictionary to a server system remote from the client device; and
   receiving the supplemental word correction dictionary from the server system, wherein the remote source comprises the server system.

7. The method of claim 6, further comprising replacing a plurality of characters received at the client device with a word from the supplemental word correction dictionary.

8. The method of claim 1, further comprising, prior to obtaining the supplemental word correction dictionary, requesting user confirmation that the supplemental word correction dictionary should be obtained, wherein the supplemental word correction dictionary is obtained in response to receiving confirmation from the user.

9. A system, comprising:
   one or more processors; and memory storing one or more programs for execution by the one or more processors, the one or more programs including instructions for:
   receiving an at least partial word input by a user;
   determining whether a use condition of the at least partial word is satisfied, the use condition including a condition that the at least partial word is not found in an existing word correction dictionary of a local device; and
   in response to determining that the use condition is satisfied:
   determining whether the at least partial word is corrected by the user;
   in accordance with the determination that the at least partial word is not corrected by the user:
   obtaining a supplemental word correction dictionary from a remote source, the supplemental word correction dictionary consisting of words associated with a same subject matter as the at least partial word; and combining the supplemental word correction dictionary with the existing word correction dictionary;
   and in accordance with the determination that the at least partial word is corrected by the user, forgoing obtaining the supplemental word correction dictionary.

10. The system of claim 9, wherein the at least partial word is included in a plurality of words input by a user.

11. The system of claim 10, wherein determining that the use condition is satisfied includes determining that at least one of the plurality of words is found in a list of trigger words.

12. The system of claim 9, wherein the supplemental word correction dictionary is selected from a plurality of supplemental word correction dictionaries, each associated with a respective subject matter.

13. The system of claim 9, wherein obtaining the supplemental word correction dictionary from the remote source includes retrieving the supplemental word correction dictionary from a storage device associated with a server system.

14. The system of claim 9, further comprising instructions for:
   sending a request for the supplemental word correction dictionary to a server system remote from system; and receiving the supplemental word correction dictionary from the server system, wherein the remote source comprises the server system.

15. A non-transitory computer readable storage medium storing one or more programs, the one or more programs comprising instructions, which when executed by an electronic device cause the device to:
receive an at least partial word input;
determine whether a use condition of the at least partial word is satisfied, the use condition including a condition that the at least partial word is not found in an existing word correction dictionary of a local device; and
in response to determining that the use condition is satisfied:
determine whether the at least partial word is corrected by the user;
in accordance with the determination that the at least partial word is not corrected by the user:
obtain a supplemental word correction dictionary from a remote source, the supplemental word correction dictionary consisting of words associated with a same subject matter as the at least partial word; and combine the supplemental word correction dictionary with the existing word correction dictionary; and
in accordance with the determination that the at least partial word is corrected by the user, forgo obtaining the supplemental word correction dictionary.

16. The non-transitory computer readable storage medium of claim 15, wherein the at least partial word is included in a plurality of words input by a user.

17. The non-transitory computer readable storage medium of claim 15, further comprising instructions for causing the electronic device to:
send a request for the supplemental word correction dictionary to a server system remote from the electronic device; and
receive the supplemental word correction dictionary from the server system, wherein the remote source comprises the server system.

18. The non-transitory computer readable storage medium of claim 15, wherein determining that the use condition is satisfied includes determining that the at least partial word has been input by a user a predetermined number of times.

19. An electronic device, comprising:
an input receiving unit configured to receive an at least partial word from a user; and
a processing unit coupled to the input receiving unit, the processing unit configured to:
determine whether a use condition of the at least partial word is satisfied, the use condition including a condition that the at least partial word is not found in an existing word correction dictionary of a local device; and
in response to determining that the use condition is satisfied:
determine whether the at least partial word is corrected by the user;
in accordance with the determination that the at least partial word is not corrected by the user:
obtain a supplemental word correction dictionary from a remote source, the supplemental word correction dictionary consisting of words associated with a same subject matter as the at least partial word; and combine the supplemental word correction dictionary with the existing word correction dictionary;

and in accordance with the determination that the at least partial word is corrected by the user, forgo obtaining the supplemental word correction dictionary.

20. The electronic device of claim 19, wherein the at least partial word is included in a plurality of words input by a user.

21. The electronic device of claim 20, wherein determining that the use condition is satisfied includes determining that at least one of the plurality of words is found in a list of trigger words.

22. The electronic device of claim 19, wherein the supplemental word correction dictionary is selected from a plurality of supplemental word correction dictionaries, each associated with a respective subject matter.

23. The electronic device of claim 19, the processing unit further configured to obtain the supplemental word correction dictionary by:
sending a request for the supplemental word correction dictionary to a server system remote from the electronic device; and
receiving the supplemental word correction dictionary from the server system, wherein the remote source comprises the server system.

24. The electronic device of claim 19, wherein determining that the use condition is satisfied includes determining that the at least partial word is found in the supplemental word correction dictionary.

25. The electronic device of claim 19, wherein determining that the use condition is satisfied includes determining that the at least partial word has been input by the user a predetermined number of times.

26. The method of claim 1, further comprising:
in accordance with the determination that the at least partial word is not corrected by the user, performing word correction on the at least partial word based on the existing word correction dictionary and the supplemental word correction dictionary.

27. The system of claim 9, further comprising instructions for:
in accordance with the determination that the at least partial word is not corrected by the user, performing word correction on the at least partial word based on the existing word correction dictionary and the supplemental word correction dictionary.

28. The non-transitory computer readable storage medium of claim 15, further comprising instructions for causing the electronic device to:
in accordance with the determination that the at least partial word is not corrected by the user, perform word correction on the at least partial word based on the existing word correction dictionary and the supplemental word correction dictionary.

29. The electronic device of claim 19, wherein the processing unit is further configured to:
in accordance with the determination that the at least partial word is not corrected by the user, perform word correction on the at least partial word based on the existing word correction dictionary and the supplemental word correction dictionary.

30. The method of claim 1, wherein the use condition further includes a condition that the at least partial word is found in the supplemental word correction dictionary.

31. The method of claim 1, wherein the supplemental word correction dictionary is predefined in the remote source prior to receiving the at least partial word input.

32. The method of claim 2, wherein determining that the use condition is satisfied includes determining that the plurality of words includes a predetermined number of words associated with the subject matter.

33. The method of claim 32, wherein determining that the use condition is satisfied further includes determining that the predetermined number of words associated with the subject matter have been input by the user with a predetermined frequency.

34. The method of claim 1, wherein determining that the use condition is satisfied includes determining that the at least partial word has been input by the user a predetermined number of times.

35. The system of claim 9, further comprising instructions for:
prior to obtaining the supplemental word correction dictionary, requesting user confirmation that the supplemental word correction dictionary should be obtained, wherein the supplemental word correction dictionary is obtained in response to receiving confirmation from the user.

36. The system of claim 9, wherein determining that the use condition is satisfied includes determining that the at least partial word is found in the supplemental word correction dictionary.

37. The system of claim 9, wherein determining that the use condition is satisfied includes determining that the at least partial word has been input by the user a predetermined number of times.

38. The system of claim 10, wherein determining that the use condition is satisfied includes determining that the plurality of words includes a predetermined number of words associated with the subject matter.

39. The system of claim 38, wherein determining that the use condition is satisfied further includes determining that the predetermined number of words associated with the subject matter have been input by the user with a predetermined frequency.

40. The non-transitory computer readable storage medium of claim 16, wherein determining that the use condition is satisfied includes determining that at least one of the plurality of words is found in a list of trigger words.

41. The non-transitory computer readable storage medium of claim 15, wherein the instructions, which when executed by the electronic device, further cause the electronic device to: prior to obtaining the supplemental word correction dictionary, request user confirmation that the supplemental word correction dictionary should be obtained, wherein the supplemental word correction dictionary is obtained in response to receiving confirmation from the user.

42. The non-transitory computer readable storage medium of claim 16, wherein determining that the use condition is satisfied includes determining that the plurality of words includes a predetermined number of words associated with the subject matter.

43. The non-transitory computer readable storage medium of claim 42, wherein determining that the use condition is satisfied further includes determining that the predetermined number of words associated with the subject matter have been input by the user with a predetermined frequency.

44. The non-transitory computer readable storage medium of claim 15, wherein determining that the use condition is satisfied includes determining that the at least partial word is found in the supplemental word correction dictionary.

45. The electronic device of claim 19, wherein the processing unit is further configured to:
prior to obtaining the supplemental word correction dictionary, request user confirmation that the supplemental word correction dictionary should be obtained, wherein the supplemental word correction dictionary is obtained in response to receiving confirmation from the user.

46. The electronic device of claim 20, wherein determining that the use condition is satisfied includes determining that the plurality of words includes a predetermined number of words associated with the subject matter.

47. The electronic device of claim 46, wherein determining that the use condition is satisfied further includes determining that the predetermined number of words associated with the subject matter have been input by the user with a predetermined frequency.

* * * * *